US010625747B2

United States Patent
Bando et al.

(10) Patent No.: US 10,625,747 B2
(45) Date of Patent: Apr. 21, 2020

(54) DEVICE AND METHOD FOR ESTIMATING SLIP ANGLE OF VEHICLE WHEEL

(71) Applicant: HITACHI CONSTRUCTION MACHINERY CO., LTD., Tokyo (JP)

(72) Inventors: Mikio Bando, Tokyo (JP); Yukihiko Ono, Tokyo (JP); Takayuki Satou, Tsuchiura (JP); Hidefumi Ishimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 72 days.

(21) Appl. No.: 15/771,150

(22) PCT Filed: Sep. 7, 2016

(86) PCT No.: PCT/JP2016/076352
§ 371 (c)(1),
(2) Date: Apr. 26, 2018

(87) PCT Pub. No.: WO2017/081921
PCT Pub. Date: May 18, 2017

(65) Prior Publication Data
US 2018/0312170 A1 Nov. 1, 2018

(30) Foreign Application Priority Data
Nov. 11, 2015 (JP) .................................. 2015-221359

(51) Int. Cl.
*B60W 40/101* (2012.01)
*B60W 40/103* (2012.01)

(52) U.S. Cl.
CPC ........ *B60W 40/101* (2013.01); *B60W 40/103* (2013.01); *B60W 2710/207* (2013.01);
(Continued)

(58) Field of Classification Search
CPC ............. B60W 40/101; B60W 40/103; B60W 2720/125; B60W 2720/106; B60W 2710/207; B60W 2710/22
See application file for complete search history.

(56) References Cited

U.S. PATENT DOCUMENTS 7,502,676 B2 * 3/2009 Ono ........................ B60T 8/172
701/41
8,712,639 B2 * 4/2014 Lu ....................... B60G 17/0195
701/36
(Continued)

FOREIGN PATENT DOCUMENTS

DE 102008013102 A1 * 4/2009
JP 2010-076617 A 4/2010
JP 2010-188762 A 9/2010

OTHER PUBLICATIONS

International Search Report of PCT/JP2016/076352 dated Nov. 22, 2016.

*Primary Examiner* — Michael J Zanelli
(74) *Attorney, Agent, or Firm* — Matingly & Malur, PC

(57) ABSTRACT

A device of estimating a slip angle of vehicle wheel has an attitude-toward-road surface estimation section that uses a series of distances to measurement points on a road surface to estimate vehicle-body-road-surface coordinate conversion information (VCCI) for conversion from a vehicle-body coordinate system to a road-surface coordinate system, an on-road-surface inertia quantity calculation section that removes a gravity acceleration component from the vehicle-body inertia quantity to obtain inertia quantity caused by motion of a vehicle body and uses the VCCI to convert from the inertia quantity caused by the motion of the vehicle body to the road-surface coordinate system, and a wheel slip angle estimation section that estimates a sideslip angle of the vehicle wheel on the basis of a difference between a wheel
(Continued)

WHEEL SLIP ANGLE ESTIMATION DEVICE 120 acceleration vector and the acceleration vector converted to the road-surface coordinate system.

9 Claims, 17 Drawing Sheets

(52) U.S. Cl.
CPC ... *B60W 2710/22* (2013.01); *B60W 2720/106* (2013.01); *B60W 2720/125* (2013.01)

(56) References Cited

U.S. PATENT DOCUMENTS

2008/0059034 A1   3/2008  Lu
2008/0264709 A1  10/2008  Fenker et al.

* cited by examiner

FIG. 2
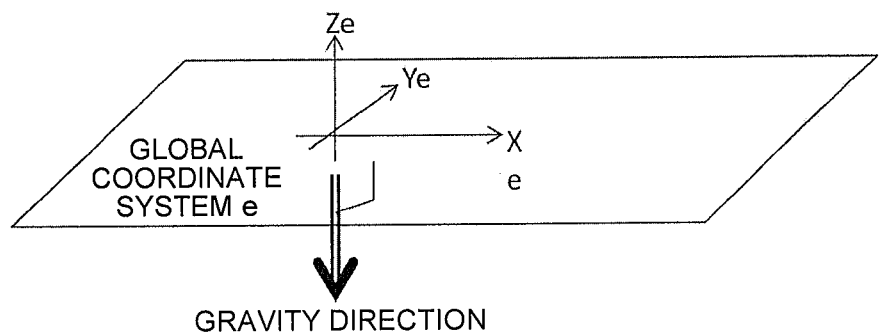
(a)
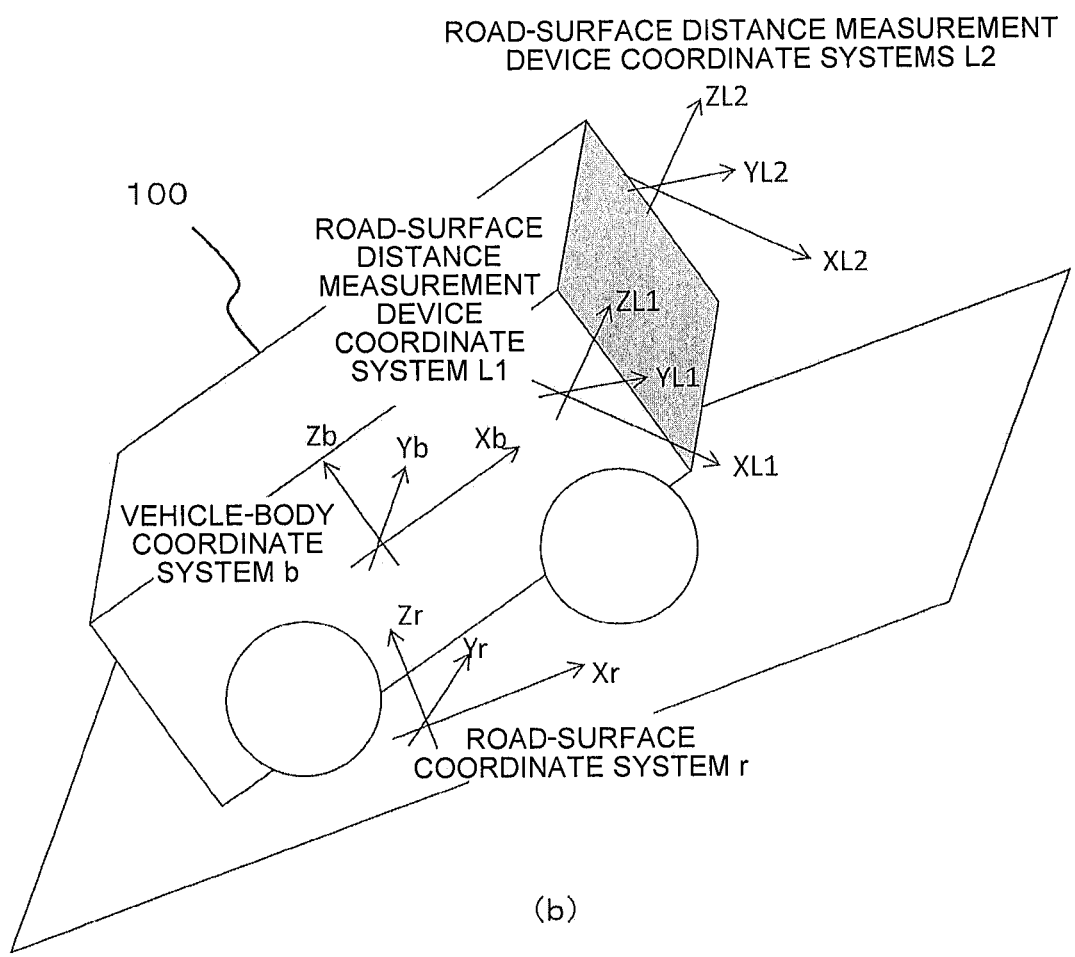
(b)

DEVICE AND METHOD FOR ESTIMATING SLIP ANGLE OF VEHICLE WHEEL

TECHNICAL FIELD

The present invention relates to a dump truck moving in a mine or a construction site and, more particularly, to a device and method for estimating a slip angle of a vehicle wheel.

A slip angle of a vehicle wheel is a critical parameter for a dump truck to stabilize the vehicle body. As a technique to estimate a slip angle of a vehicle wheel, Patent Literature 1 discloses IMU (Inertial Measurement Unit) mounted in a vehicle body having vehicle wheels and the configuration to measure a steering angle to estimate a slip angle of the vehicle wheel. The technique to estimate a slip angle of a vehicle wheel in Patent Literature 1 is on the assumption that the vehicle body is parallel to the flat road surface with which the four vehicle wheels are in contact. By this assumption, the vehicle wheels outputting a speed on the road surface is in agreement with output axes of an IMU such as acceleration, angular velocity of the vehicle body on suspensions mounted a vehicle, and therefore a slip angle of the vehicle wheel can be correctly obtained. And, the assumption is not fully disproved in many passenger vehicles. This corresponds to obtaining a slip angle by using the fact that the tire tilts in response to tilting of the vehicle body, as can be seen from the phrase "Because, upon occurrence of a roll angle, (partial omission), a tire-road contact point moves toward left and right, the relationship between it and a vehicle speed v causes a tire slip angle" described in paragraph 0038 of the cited literature.

CITATION LIST

Patent Literature

PATENT LITERATURE: JP-A No. 2010-076617

SUMMARY OF INVENTION

Technical Problem

Typically, a vehicle is constructed by mounting a vehicle body on vehicle wheels though suspensions. Where a large load of payload in a vessel is applied to the vehicle body on the suspensions such as in a dump truck, the suspensions contract, so that the vehicle body is tilted with respect to the vehicle wheels and the axle by the load. Although the vehicle wheels and the axles are parallel to the road surface, the contraction of the suspensions tilts the vehicle body on the suspensions, so that the assumption that the vehicle body and the road surface ate parallel to each other is not able to be maintained. Because of this, the value measured by the IMU installed in the vehicle body represents a measurement of acceleration in any direction other than the road surface, which in turn makes it difficult to calculate an accurate slip angle of the vehicle wheel. As a result, though the technique disclosed in Patent Literature 1 is applied to a dump truck in which a heavier weight is applied to the vehicle body than that of a passenger vehicle, there still remains a difficulty in measuring an accurate slip angle of the vehicle body.

The present invention has been made in view of the above problems and it is an object of the present invention to estimate a slip angle of a vehicle wheel with accuracy by use of an output value from an IMU installed in a vehicle body in a damp truck which varies greatly in body weight depending on a loading state.

Solution to Problem

To address the problems, an aspect of the present invention provides a device for estimating a slip angle of a vehicle wheel of a dump truck which is equipped with vehicle wheels and a vehicle body on the vehicle wheels via suspensions and includes a vehicle-body IMU that is mounted to the vehicle body to output acceleration and angular velocity of the vehicle body, a road-surface distance measurement device that measures a distance to a road surface including a wheel-road contact point of the vehicle wheel mounted to the vehicle body, a wheel speed measurement device that outputs a wheel speed based on RPM of the vehicle wheel, and a steering angle measurement device that measures a steering angle of the vehicle wheel. The device for estimating a slip angle of a vehicle wheel of the dump truck includes an attitude-toward-road-surface estimation section that uses a series of distances to measurement points on the road surface measured by the road-surface distance measurement device to estimate vehicle-body-road-surface coordinate conversion information for conversion from a vehicle-body coordinate system of a three orthogonal axis system including a longitudinal axis of the vehicle body, a lateral axis of the vehicle body and an up-down axis orthogonal to both the longitudinal axis and the lateral axis, to a road-surface coordinate system of a three orthogonal axis system including two orthogonal axes obtained by projecting the longitudinal axis and the lateral axis onto the road surface and a road-surface vertical axis perpendicular to the two orthogonal axes. The device for estimating a slip angle of a vehicle wheel of the dump truck includes also an on-road-surface inertia quantity calculation section that: removes a gravity acceleration component from acceleration and angular velocity of the vehicle body measured by the vehicle-body IMU defined by the vehicle-body coordinate system in order to obtain acceleration and angular velocity caused by vehicle-body motion; and uses the vehicle-body-road-surface coordinate conversion information to convert from the acceleration and angular velocity caused by vehicle-body motion to the road-surface coordinate system. The device for estimating a slip angle of a vehicle wheel of the dump truck includes also a wheel slip angle estimation section that: determines a wheel acceleration vector derived from the wheel speed measurement device along an inclination direction of the vehicle wheel, on the basis of a steering angle from the steering angle measurement device and a wheel speed measured by the wheel speed measurement device; uses the acceleration and angular velocity caused by vehicle-body motion converted to the road-surface coordinate system to determine an acceleration vector at the wheel-road contact point derived from the vehicle-body IMU; and estimates a sideslip angle of the vehicle wheel on the basis of a difference between the acceleration vector and the wheel acceleration vector at a wheel-road contact point derived from the wheel speed measurement device.

Advantageous Effects of Invention

According to the present invention, a slip angle of a vehicle wheel is able to be estimated with accuracy by use of an output value from an IMU installed in a vehicle body in a damp truck which varies greatly in body weight. These

BRIEF DESCRIPTION OF DRAWINGS

FIG. 2 shows explanatory diagrams illustrating four coordinate systems, in which (a) illustrates a global coordinate system and (b) illustrates a road-surface coordinate system, a vehicle-body coordinate system and road-surface distance measurement device coordinate system L1, L2.

DESCRIPTION OF EMBODIMENTS

The processing to calculate an accurate slip angle in a position of each of the vehicle wheels on a road surface will now be described.

First Embodiment

Figure 1:
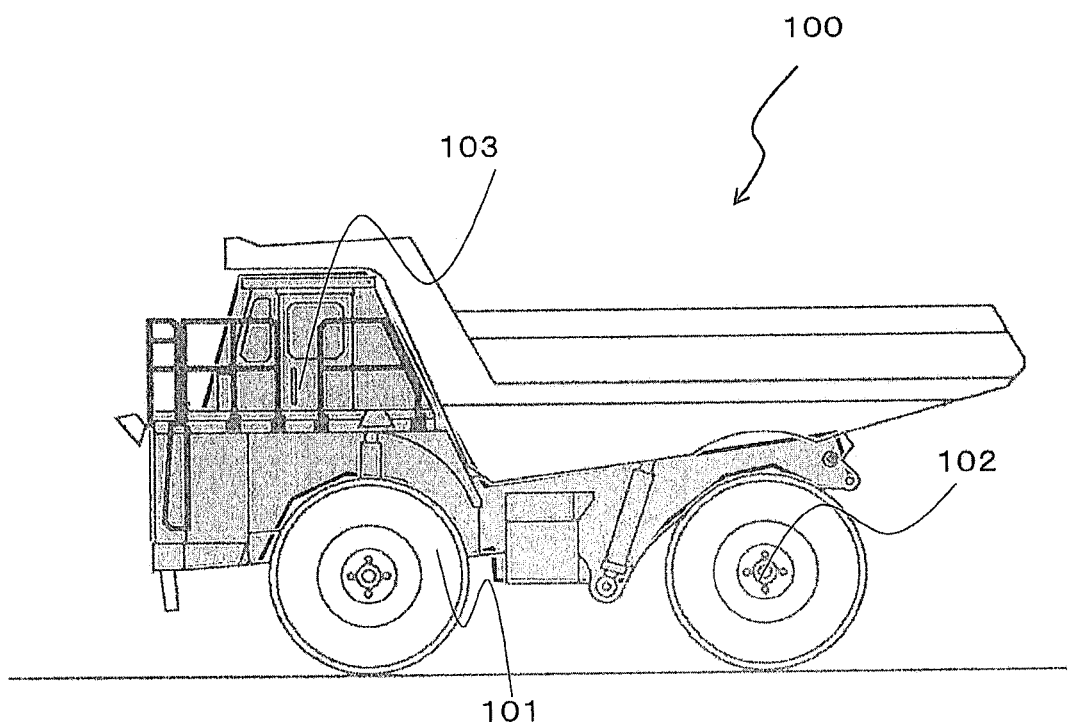
FIG. 1 is a diagram illustrating a rough configuration of a dump truck.

Initially, a description is given of a method of using mainly a measurement value from a sensor to estimate a slip angle of a vehicle wheel in the configuration using the minimum number of estimation values. FIG. 1 is a diagram illustrating a rough configuration of a dump truck. The dump truck 100 is configured to include front and rear, left and right vehicle wheels 101, an axle 102 supporting each vehicle wheel, and a vehicle body 103 which is a sturdy frame connected to the axles through springs or the like (e.g., suspensions which are not shown).

Figure 3:
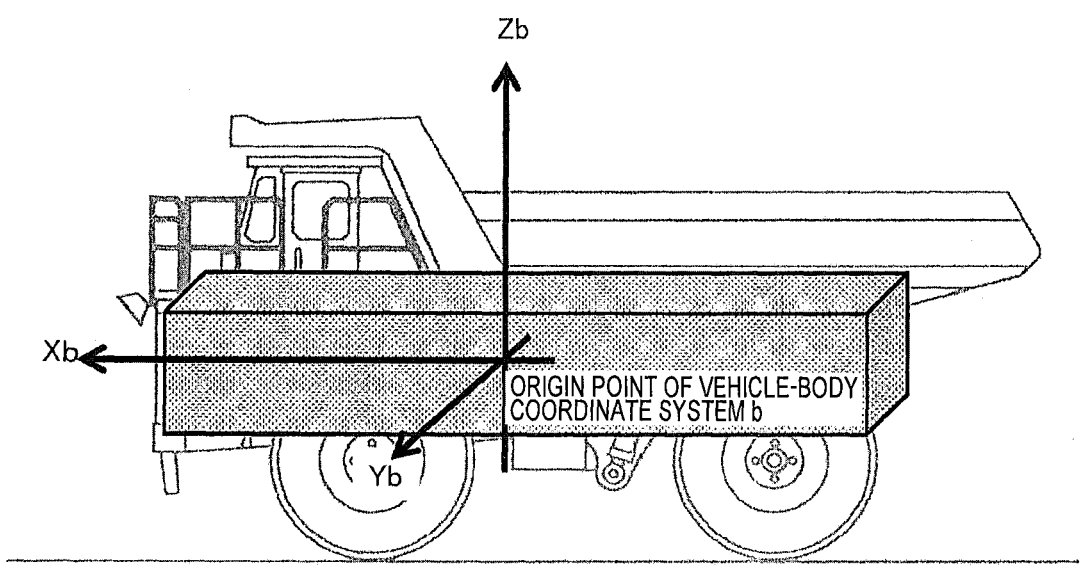
FIG. 3 is a diagram illustrating the vehicle-body coordinate system.
Figure 4:
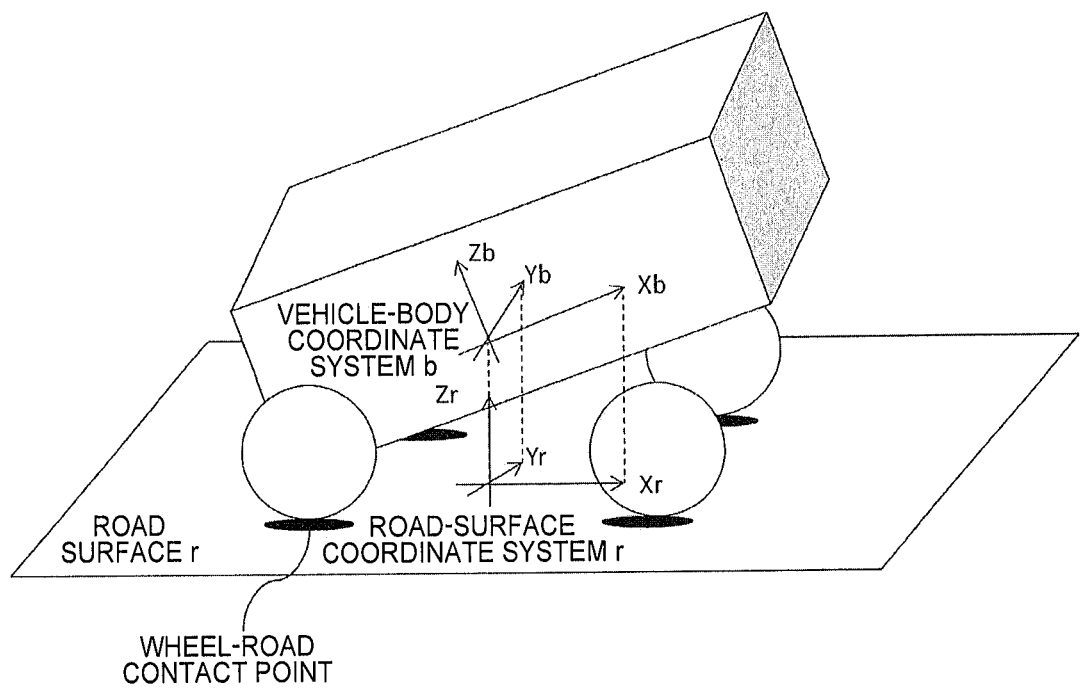
FIG. 4 is an explanatory diagram illustrating the road-surface coordinate system.

Four coordinate systems used in the description herein are defined. FIG. 2 shows explanatory diagrams illustrating the four coordinate systems, in which (a) illustrates a global coordinate system and (b) illustrates a road-surface coordinate system, a vehicle-body coordinate system and road-surface distance measurement device coordinate system L1, L2. FIG. 3 is a diagram illustrating the vehicle-body coordinate system. FIG. 4 is an explanatory diagram illustrating the road-surface coordinate system.

Firstly, an orthogonal three-axis coordinate system has an origin point at a certain point being on the earth and being not far from a current location of the vehicle, and has an Xe axis and a Ye axis set on a plane crossing perpendicular to a gravity direction, and also a Ze axis having a remaining orientation in a right-hand system other than the Xe axis and Ye axis. The orthogonal three-axis coordinate system is referred to as a global coordinate system e (see FIG. 2(a)).

Secondly, an orthogonal three-axis coordinate system, which has an Xb axis in the longitudinal direction of the vehicle, a Yb axis in the lateral direction of the vehicle and a Zb axis in the upper direction, is referred to as a vehicle-body coordinate system b (see FIG. 2(b)). Assume that the origin point of the vehicle-body coordinate system b shown in FIG. 3 is a given point fixed in the vehicle body.

Thirdly, a plane including points with which a plurality of the wheels 101 come into contact is referred to as a road surface, and the road surface on which the dump truck 100 operates is assumed to be an approximately flat plane at all instances. On the road surface, an orthogonal three-axis coordinate system has an Xr axis and a Yr axis of the road-surface coordinate system r which are axes respectively obtained by projecting the Xb axis and Yb axis of the vehicle-body coordinate system b onto the foregoing plane, and has a Zr axis with a remaining orientation in a right-hand system other than the Xr axis and Yr axis. The orthogonal three-axis coordinate system is referred to as the road-surface coordinate system r (see FIG. 4). In terms of the definition, when viewed from the global coordinate system e, the road-surface coordinate system r seems to move successively along with the vehicle-body coordinate system b. Also, the directions of the Xr axis and the Yr axis are aligned with the directions of the Xb axis and Yb axis of the vehicle-body coordinate system b. However, although the Zr axis has a direction perpendicular to the plane including the points with which the plurality of vehicle wheels is in contact, the vehicle body 103 is not always parallel to the road surface, and therefore the Zr axis is not always aligned with the Zb axis of the vehicle-body coordinate system b.

Fourthly, in the configuration to measure a distance to the road surface fixed to a given point of the vehicle body 103 (referred to as a road-surface distance measurement device. Details will be described later), an orthogonal three-axis coordinate system has an origin point at a measurement starting point of the road-surface distance measurement device that measures a distance, and also has an XL axis in a direction in which a distance is measured, a YL axis in a direction perpendicular to the XL axis and a ZL axis with a remaining orientation in a right-hand system other than the XL axis and YL axis. The orthogonal three-axis coordinate system is referred to as the road-surface distance measurement device coordinate system L. In terms of the definition, when viewed from the global coordinate system e, the road-surface distance measurement device coordinate system L seems to move successively along with the vehicle-body coordinate system b. Where a plurality of the road-surface distance measurement devices is fixed to the vehicle body 103, the coordinate system is defined for each road-surface distance measurement device, and a coordinate system defined by an i-th road-surface distance measurement device of the n road-surface distance measurement devices is referred to as a road-surface distance measurement device coordinate system Li.

In the following description, e, b, r, Li subscripts to the right of variables or values mean that each of the variables or values with the subscripts is the variable or value expressed in the global coordinate system e, the vehicle-body coordinate system b, the road-surface coordinate system r or the i-th road-surface distance measurement device coordinate system Li.

A wheel slip angle refers to an angle which a wheel velocity vector forms with a direction in which the wheel 101 faces, on the road-surface coordinate system r.

Figure 5:
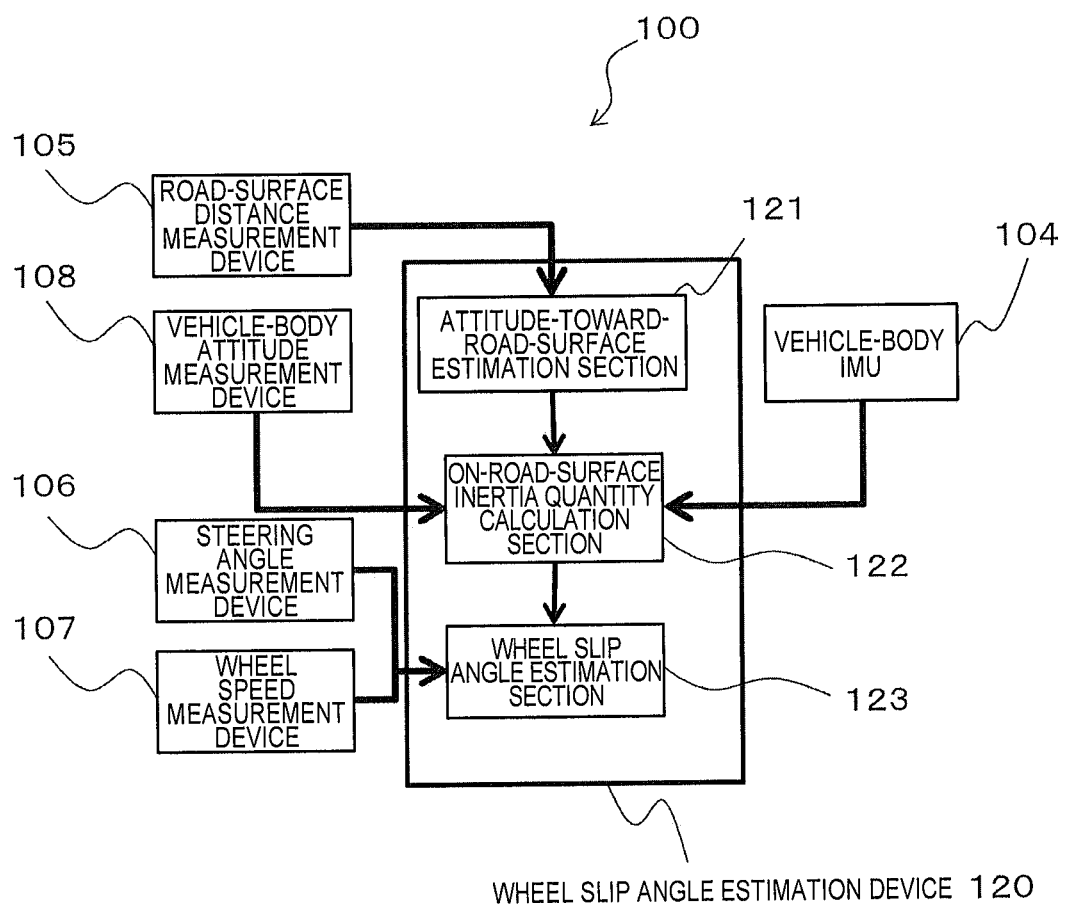
FIG. 5 is a block diagram illustrating a function configuration of a dump truck.

FIG. 5 is a block diagram illustrating the function configuration of the dump truck 100. As illustrated in FIG. 5, the vehicle body 103 of the dump truck 100 is installed with: a vehicle-body IMU 104 that measures angular velocity, acceleration including gravity acceleration, or the like, in the vehicle-body coordinate system b; a road-surface distance measurement device 105 capable of measuring two or more points on the road surface which can be connected or approximated by a single straight line intersecting the travel direction of the vehicle body at the same time of sampling; a steering-angle measurement device 106 that measures an inclination of the vehicle wheel from the Xb axis of the vehicle-body coordinate system b; a wheel speed measurement device 107 that measures a wheel speed based on a wheel rpm; and a vehicle-body attitude measurement device 108 that measures a vehicle-body attitude which is represented by two angles, an inclination angle formed between a plane expanded by the Xe axis and Ye axis of the global coordinate system e and the Xb axis and Yb axis of the vehicle-body coordinate system b, and also a rotation angle from the Xe axis of the global coordinate system e to the Xb axis of the vehicle-body coordinate system b.

Also, the dump truck 100 further includes a vehicle-body slip angle estimation device 120, and each of the vehicle-body IMU 104, the road-surface distance measurement device 105, the steering angle measurement device 106, the wheel speed measurement device 107 and the vehicle-body attitude measurement device 108 outputs a measurement result of the device to the vehicle-body slip angle estimation device 120. The vehicle-body slip angle estimation device 120 includes an attitude-toward-road-surface estimation section 121, an on-road-surface inertia quantity calculation section 122 and a wheel slip angle estimation section 123. The vehicle-body slip angle estimation device 120 is configured in collaboration between hardware and software, in which the hardware includes: a computing and control device such as a CPU (Central Processing Unit) or the like; a storage device such as HDD (Hard Disk Drive) and ROM (Read Only Memory) storing a program executed by the vehicle-body slip angle estimation device 120, or the like; and RAM (Random Access Memory) serving as a workspace when the CPU executes the program, and the software implements various functions of the attitude-toward-road-surface estimation section 121, the on-road-surface inertia quantity calculation section 122 and the wheel slip angle estimation section 123.

The attitude-toward-road-surface estimation section 121 uses a series of distances from the road surface measured by the road-surface distance measurement device 105 to estimate a relative inclination between the vehicle body 103 and the road surface as a coordinate conversion matrix $C_{rb}$ from the vehicle-body coordinate system b to the road-surface coordinate system r.

The on-road-surface inertia quantity calculation section 122 removes the gravity acceleration component from the attitude-toward-road-surface estimation section 121, the vehicle-body IMU 104 and the vehicle-body attitude measurement device 108, and converts from the inertial quantity of the vehicle represented in the vehicle-body coordinate system b to the inertial quantity of the vehicle represented in the road-surface coordinate system r.

The wheel slip angle estimation section 123 uses the on-road-surface inertial quantity calculation section 122 and the steering angle measurement device 106 and the wheel speed measurement device 107 to estimate a slip angle of each vehicle wheel with high accuracy.

Figure 6:
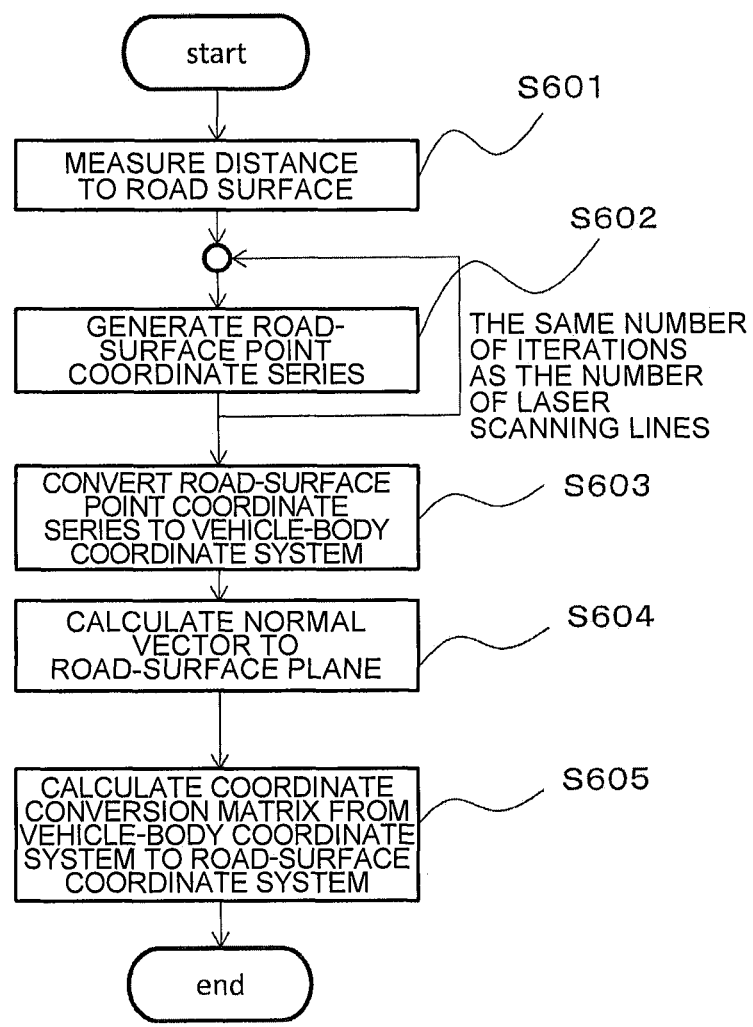
FIG. 6 is a diagram illustrating a processing flow of an attitude-toward-road-surface estimation section.
Figure 7:
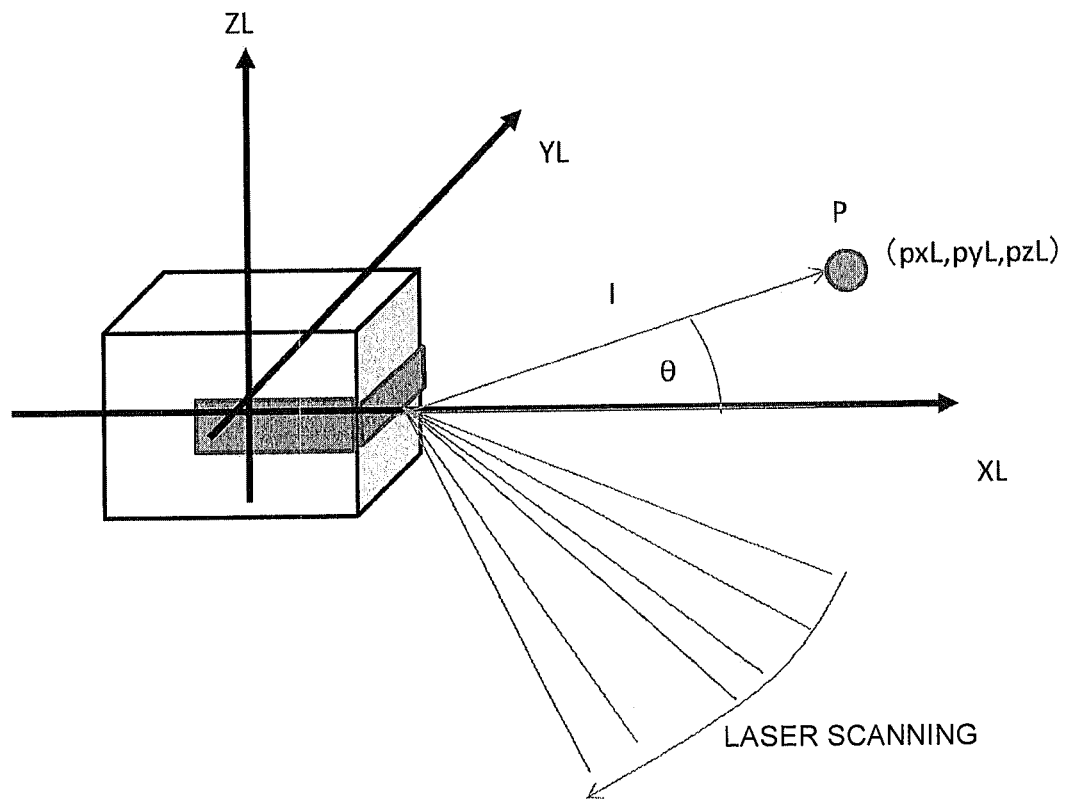
FIG. 7 is a diagram illustrating a coordinate system and measurement points of LIDAR (Laser Imaging Detection and Ranging).
Figure 8:
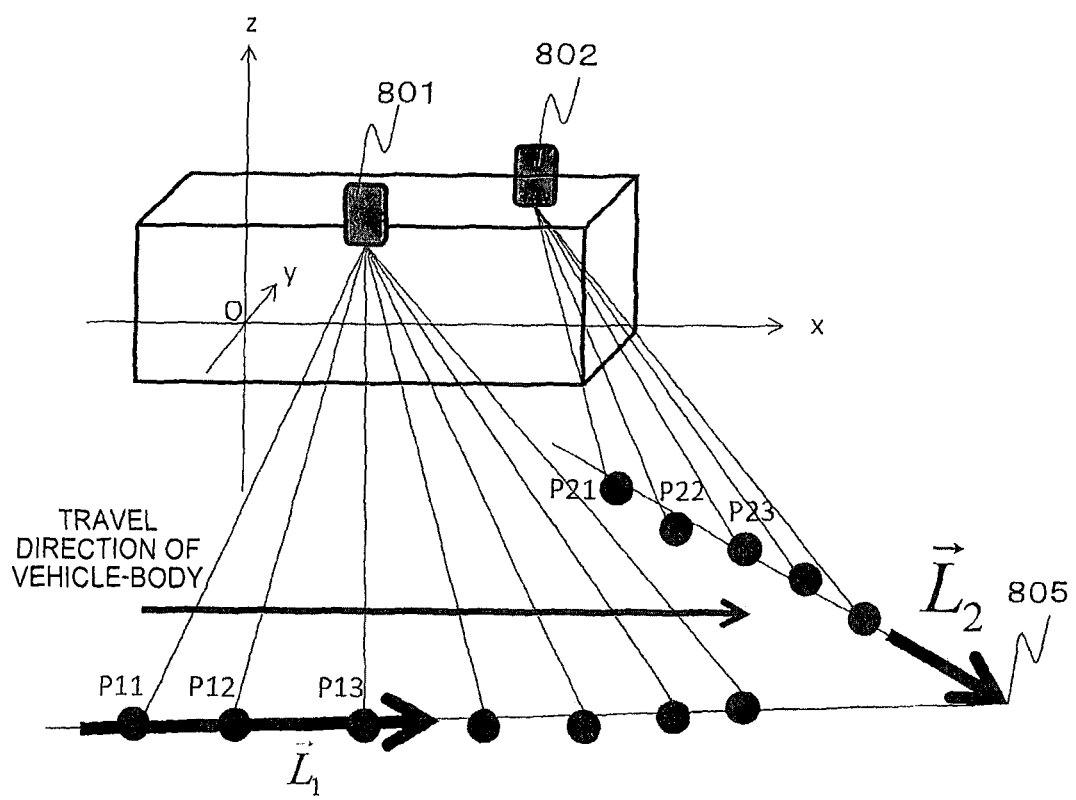
FIG. 8 is a model diagram of a measurement point series of LIDAR installed in a vehicle body.

Reference will now be made to FIG. 6 to FIG. 8 to describe how the attitude-toward-road-surface estimation section 121 estimates relative attitude between the road surface and the vehicle body. FIG. 6 is a diagram illustrating a processing flow in the attitude-toward-road-surface estimation section. FIG. 7 is a diagram illustrating a coordinate system and measurement points of LIDAR. FIG. 8 is a model diagram of a measurement point series of the LIDAR installed in the vehicle body.

Initially, at Step 601, the road-surface distance measurement device 105 is caused to measure a distance from the road-surface distance measurement device 105 secured to the vehicle body 103 to the road surface. In the first embodiment, the case where two LIDARs performing linear scanning of laser are employed as the distance measurement devices is described by way of example. As illustrated in FIG. 7, the LIDAR linearly scans continuously over a distance up to a certain point. Also, assume that the distance measured by the LIDAR is a distance I up to a measurement point P and through the scan angle. In accordance with the above-described definition of the road-surface distance measurement device coordinate system L, an XL axis is set in the direction of the scanning laser emission surface of the LIDAR, a YL axis is set in a sideways direction which forms the right hand system in conjunction with the XL axis, and a ZL axis is set in the direction of a normal formed by these two axes. The distance I to the point P can be expressed in 3D coordinates (pxL, pyL, pzL) by an angle θ which is formed by the XL axis and the distance I at the time of measurement. A coordinate conversion matrix $C_{bL}$ from the road-surface distance measurement device coordinate system L fixed to the LIDAR to the vehicle-body coordinate system b is given beforehand by measuring an installation angle of the LIDAR. Assume that the two LIDARs 801, 802 are installed on the side of the vehicle body to be directed toward the road surface in such a manner as to cause lasers to intersect each other (intersection point 805) as illustrated in FIG. 8.

Next, at Step 602, a point coordinate series measured as points on the road surface is created for each laser scanning line. Mention is made of using the two LIDARs 801, 802 to perform two laser scans in total in the present embodiment. The road-surface point coordinate series is created such as $P11=(p11x_L, p11y_L, p11z_L)$, $P12=(p12x_L, p12y_L, p12z_L)$, ..., $P1i=(p1ix_L, p1iy_L, p1iz_L)$.

Next, at Step 603, the road-surface point coordinate series produced in Step 602 is expressed in the vehicle-body coordinate system. Assume that the LIDAR 801 is caused to measure n measurement point series, and each of the values is $P1i=(p1ix_L, p1iy_L, p1iz_L)$ ($0<i<=n$) in the road-surface distance measurement device coordinate system L. At this time, to express each point in the vehicle-body coordinate system b, the location at which the LIDAR 801 is installed can be found by a point (P1$x_b$, P1$y_b$, P1$z_b$) expressed in the vehicle-body coordinate system b as the following formula (1).

[Formula 1]

$$\begin{pmatrix} p1ix_b \\ p1iy_b \\ p1iz_b \end{pmatrix} = C_{bL} \begin{pmatrix} p1ix_L \\ p1iy_L \\ p1iz_L \end{pmatrix} + \begin{pmatrix} P1x_b \\ P1y_b \\ P1z_b \end{pmatrix} \quad (1)$$

(On-road-surface measurement point coordinates expressed in the vehicle-body coordinate system b)=(conversion matrix from the road-surface distance measurement device coordinate system L to the vehicle-body coordinate system b)×(measurement point coordinates expressed in the road-surface distance measurement device coordinate system L)+(point of the installation position of LIDAR 801 expressed in the vehicle-body coordinate system b)

Likewise, assume that the LIDAR 802 also measures m measurement point series, and each of the values is P2i=(p2$ix_L$, p2$iy_L$, p2$iz_L$) (0<i<=m) in the road-surface distance measurement device coordinate system L. At this time, to express each point in the vehicle-body coordinate system b, the position at which the LIDAR 802 is installed can be found by a point (P2$x_b$, P2$y_b$, P2$z_b$) expressed in the vehicle-body coordinate system b as the following formula (2).

[Formula 2]

$$\begin{pmatrix} p2ix_b \\ p2iy_b \\ p2iz_b \end{pmatrix} = C_{bL} \begin{pmatrix} p2ix_L \\ p2iy_L \\ p2iz_L \end{pmatrix} + \begin{pmatrix} P2x_b \\ P2y_b \\ P2z_b \end{pmatrix} \quad (2)$$

(On-road-surface measurement point coordinates expressed in the vehicle-body coordinate system b)=(conversion matrix from the road-surface distance measurement device coordinate system L to the vehicle-body coordinate system b)×(measurement point coordinates expressed in the road-surface distance measurement device coordinate system L)+(point of the installation position of LIDAR 802 expressed in the vehicle-body coordinate system b)

Next, at Step 604, a normal vector to the road-surface plane is calculated. The normal vector means that a unit vector on the Zr axis of the road-surface coordinate system r is expressed in the vehicle-body coordinate system b.

Given that the two distance measurement devices (the LIDARs 801, 802 in the present embodiment) are in measurement synchronization, the total number of point series obtained from the two distance measurement devices in one scan cycle can be n+m point series. With the plane including these points being the road surface, a normal vector $U_b$ to the road surface is determined by the least-squares method. The normal vector $U_b$ is a normal unit vector of a plane equation Ax+By+Cz+D=0 representing a road surface, which is expressed as the following formula (3).

[Formula 3]

$$\vec{U}_b = \begin{pmatrix} A \\ B \\ C \end{pmatrix} \quad (3)$$

Where $\vec{U}_b$: normal vector

From P1i=(p1$ix_L$, p1$iy_L$, p1$iz_L$) (0<i<=n) and P2i=(p2$ix_L$, p2$iy_L$, p2$iz_L$) (0<i<=m) which are the on-road-surface measurement point coordinates expressed in the vehicle-body coordinate system b and measured by the two road-surface distance measurement devices 105, which have been obtained in Step 603, the following formula (4) can be used to determine the normal vector $U_b$ by the least-squares method.

[Formula 4]

$$\vec{U}_b = M^{-1} W \quad (4)$$

Where $$M = \begin{pmatrix} \sum_i^{n+m} 1 & \sum_j^{1,2} \sum_i^{n,m} pjix_b & \sum_j^{1,2} \sum_i^{n,m} pjiy_b \\ \sum_j^{1,2} \sum_i^{n,m} pjix_b & \sum_j^{1,2} \sum_i^{n,m} pjiz_b \cdot pjix_b & \sum_j^{1,2} \sum_i^{n,m} pjix_b \cdot pjiy_b \\ \sum_j^{1,2} \sum_i^{n,m} pjiy_b & \sum_j^{1,2} \sum_i^{n,m} pjix_b \cdot pjiy_b & \sum_j^{1,2} \sum_i^{n,m} pjiy_b \cdot pjiy_b \end{pmatrix}$$

$$W = \begin{pmatrix} \sum_j^{1,2} \sum_i^{n,m} pjiz_b \\ \sum_j^{1,2} \sum_i^{n,m} pjix_b \cdot pjiz_b \\ \sum_j^{1,2} \sum_i^{n,m} pjiy_b \cdot pjix_b \end{pmatrix}$$

Next, at Step 605, a coordinate conversion matrix from the vehicle coordinate system b to the road-surface coordinate system r is calculated. In accordance with the above mentioned definition, two orthogonal vectors exr, eyr which are obtained by projecting the Xb axis and Yb axis of the vehicle-body coordinate system b onto the road surface, and a vector of the normal ezr to the orthogonal vectors exr, eyr match respectively an Xr axis, a Yr axis and a Zr axis, thereby forming the road-surface coordinate system r. Because the normal vector $U_b$ expressed in the vehicle-body coordinate system b obtained in Step 604 exists on the Zr axis of the road-surface coordinate system r, a rotation matrix $R_b$ of the Zb axis of the vehicle-body coordinate system b and the normal vector $U_b$=(A, B, C) which is obtained from the road-surface plane equation similarly expressed in the vehicle-body coordinate system can be obtained from a quaternion ($q_0$, $q_1$, $q_2$, $q_3$) as the following formula (5).

[Formula 5]

$$R_b = \begin{pmatrix} 2(q_0^2 + q_1^2) - 1 & 2(q_1q_2 - q_0q_3) & 2(q_1q_3 + q_0q_2) \\ 2(q_1q_2 + q_0q_3) & 2(q_0^2 + q_2^2) - 1 & 2(q_2q_3 - q_0q_1) \\ 2(q_1q_3 - q_0q_2) & 2(q_3q_3 + q_0q_1) & 2(q_0^2 + q_3^2) - 1 \end{pmatrix} \quad (5)$$

Where the quaternion $(q_0, q_1, q_2, q_3)$ is expressed as follows:

$$q_0 = \cos\frac{\vartheta}{2}, \, q_1 = -B\sin\frac{\vartheta}{2}, \, q_2 = A\sin\frac{\vartheta}{2}, \, q_3 = 0$$

Where $$\vartheta = \arccos\frac{C}{\sqrt{A^2 + B^2}}$$

As described above, because the normal vector $U_b$ of the road surface expressed in the vehicle-body coordinate system b coincides with the Zr axis of the road-surface coordinate system r, the coordinate conversion matrix $C_{rb} = R_b^t$ from the vehicle-body coordinate system b to the road-surface coordinate system r can be obtained. Through the above processing flow, the processing in the attitude-toward-road-surface estimation section 121 is terminated.

Figure 9:
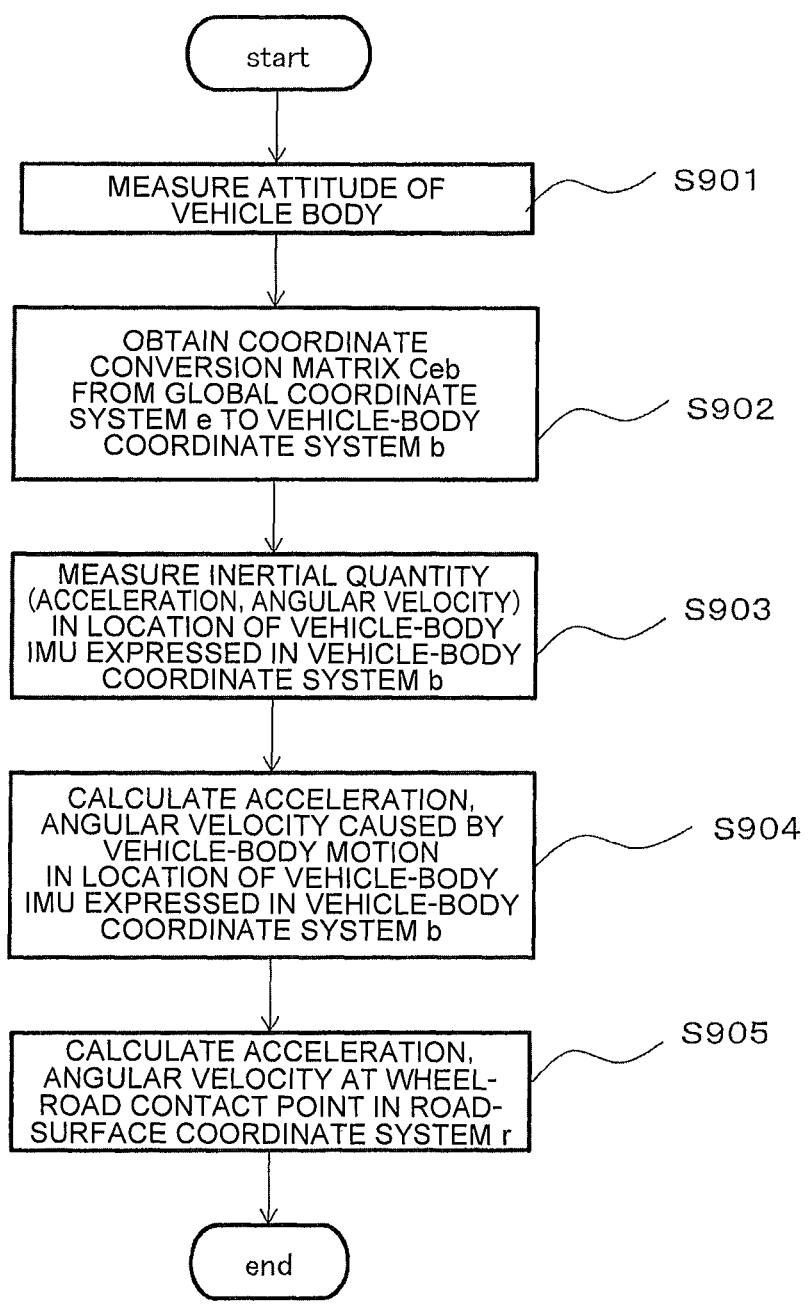
FIG. 9 is a diagram illustrating a processing flow of an on-road-surface inertia quantity calculation section.

The processing in the on-road-surface inertia quantity calculation section 122 will now be described following the flow illustrated in FIG. 9. FIG. 9 is a diagram illustrating the processing flow of the on-road-surface inertia quantity calculation section.

Initially, at Step 901, the vehicle-body attitude measurement device 108 measures an attitude of the vehicle body. In the present embodiment, an attitude is a parameter for obtaining a conversion from the global coordinate system e which is set on the plane crossing perpendicular to the direction of the gravity acceleration, to the vehicle-body system b. By way of example, a method of installing three location estimation devices to estimate an attitude is disclosed in JP-A No. 2010-190806, which is applied to attitude measuring means to measure an attitude. An attitude measured by the foregoing method includes three conversion parameters from the global coordinate system e to the vehicle-body coordinate system b, which are referred to as a roll angle $\Psi$, a pitch angle $\varphi$ and a yaw angle $\theta$.

Next, at Step 902, a coordinate conversion matrix $C_{eb}$ from the global coordinate system e to the vehicle-body coordinate system b is calculated. The angles measured in Step 901 are rotation angles of the Xe axis, the Ye axis, the Ze axis of the respective axes of the global coordinate system e, and in the present embodiment, it is considered that the Ze axis, the Ye axis and the Xe axis are rotated in this order by respective angles. At this time, the coordinate conversion matrix $C_{eb}$ is obtained as the following formula (6).

[Formula 6]

$$C_{eb} = \begin{pmatrix} \cos\theta\cos\phi & \sin\theta\cos\phi & -\sin\phi \\ -\sin\theta\cos\psi + \cos\theta\sin\phi\sin\psi & \cos\theta\cos\psi + \sin\theta\sin\phi\sin\psi & \cos\phi\sin\psi \\ \sin\theta\sin\psi + \cos\theta\sin\phi\cos\psi & -\cos\theta\sin\psi + \sin\theta\sin\phi\cos\psi & \cos\phi\cos\psi \end{pmatrix} \quad (6)$$

Next, at Step 903, the inertia quantity in the vehicle coordinate system b is measured. The inertia quantity is referred herein to as acceleration or angular velocity. The vehicle-body IMU 104 measures angular velocity and acceleration including gravity acceleration with respect to each axis of the vehicle-body coordinate system b. In the present embodiment, as the vehicle-body IMU 104, the use of a three-axis acceleration sensor and a three-axis gyro sensor installed for each of the Xb axis, the Yb axis and the Zb axis of the vehicle-body coordinate system b may be contemplated.

Next, at Step 904, acceleration and angular velocity caused by motion of the vehicle body 103 are calculated. The coordinate conversion matrix from the global coordinate system e to the vehicle-body coordinate system b which has been calculated in Step 902 is used to remove the gravity term in the vehicle-body coordinate system b from the output value vector $\alpha_b$ of the acceleration sensor obtained in Step 903, in order to calculate an acceleration vector $a_b$ caused by the motion of the vehicle body 103.

[Formula 7]

$$\vec{a}_b = \vec{\alpha}_b - C_{eb}^{\alpha i}\vec{g}_e \quad (7)$$

Where the output value vector $\alpha_b$ of the acceleration sensor is $$\vec{\alpha}_b = (\alpha_{xb}, \alpha_{yb}, \alpha_{zb})^t,$$

$\vec{g}_e$ is a gravity acceleration vector with the downward Ze axis expressed in the global coordinate system e.
(Vehicle-body acceleration in the vehicle-body coordinate system b)=(an acceleration sensor output value measured in the vehicle-body coordinate system b)−(a coordinate conversion matrix from the global coordinate system e to the vehicle-body coordinate system b)×(a gravity acceleration vector expressed in the global coordinate system e)

For the vehicle-body angular velocity, unless an error expressed in the global coordinate system e is input, an output value vector $\omega_b$ of a gyro sensor obtained in Step 903 (see the following formula (8)) is used directly.

[Formula 8]

$$\vec{\omega}_b = (\omega_{xb}, \omega_{yb}, \omega_{zb})^{i\,t} \quad (8)$$

Next, at Step 905, acceleration and angular velocity caused by motion of the vehicle body at a wheel-road contact point of the wheel are expressed in the road-surface coordinate system r. Two vectors, an acceleration vector $a_b$ added to the vehicle body expressed in the vehicle-body coordinate system b obtained in Step 904, and an output-value vector $\omega_b$ of the gyro sensor which is angular velocity of each axis of the vehicle-body coordinate system b, are expressed in the road-surface coordinate system r by use of the coordinate conversion matrix $C_{rb}$ obtained in the attitude-toward-road-surface estimation section 121. By the coordinate conversion matrix $C_{rb}$ from the vehicle-body coordinate system b to the road-surface coordinate system r, an acceleration vector $a_r$ and an angular velocity vector $\omega_r$ on the vehicle-body IMU 104, which are expressed in the road-surface coordinate system r, are expressed as the following formula (9).

[Formula 9]

$$\left.\begin{array}{l}\vec{\omega}_r = C_{rb}\vec{\omega}_b \\ \vec{a}_r = C_{rb}\vec{a}_b\end{array}\right\} \quad (9)$$

Therefore, an acceleration vector $a_{tr}$ expressed in the road-surface coordinate system r at the wheel-road contact point is expressed as the following formula (10).

[Formula 10]

$$\vec{a}_{tr} = \vec{a}_r + \dot{\vec{\omega}}_r \times C_{rb}\vec{r}_b + \vec{\omega}_r \times (\vec{\omega}_r \times C_{rb}\vec{r}_b) \quad (10)$$

(Acceleration expressed in the road-surface coordinate system r at a wheel-road contact point)=(acceleration on the vehicle-body IMU 104 expressed in the road-surface coordinate system r)+(the transport component derived from angular acceleration expressed in the road-surface coordinate system r)+(the transport component derived from angular velocity expressed in the road-surface coordinate system r)

Where $\dot{\vec{\omega}}_r$ may be a derivative value of angular velocity on the road surface, which may assume a difference at the time of sampling in a simple manner. $\vec{r}_b$ is a vector from the vehicle-body IMU 104 to a wheel-road contact point of each wheel 101 which is expressed in the vehicle-body coordinate system b. This is handled as a constant value from preliminary design values regardless of deformation of the wheels 101.

Through the above processing flow, the processing in the on-road-surface inertia quantity calculation section 122 is terminated.

Figure 10:
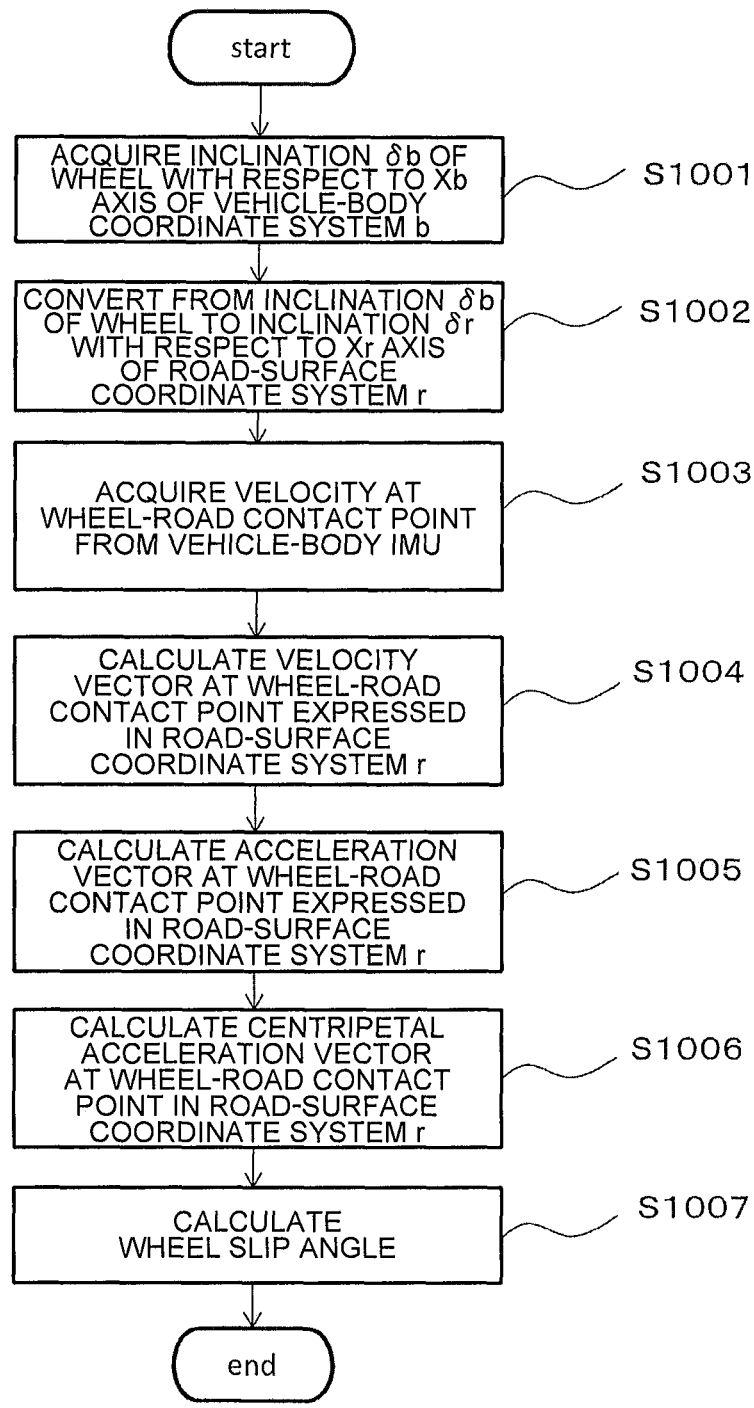
FIG. 10 is a diagram illustrating a processing flow of a wheel slip angle estimation section.
Figure 11:
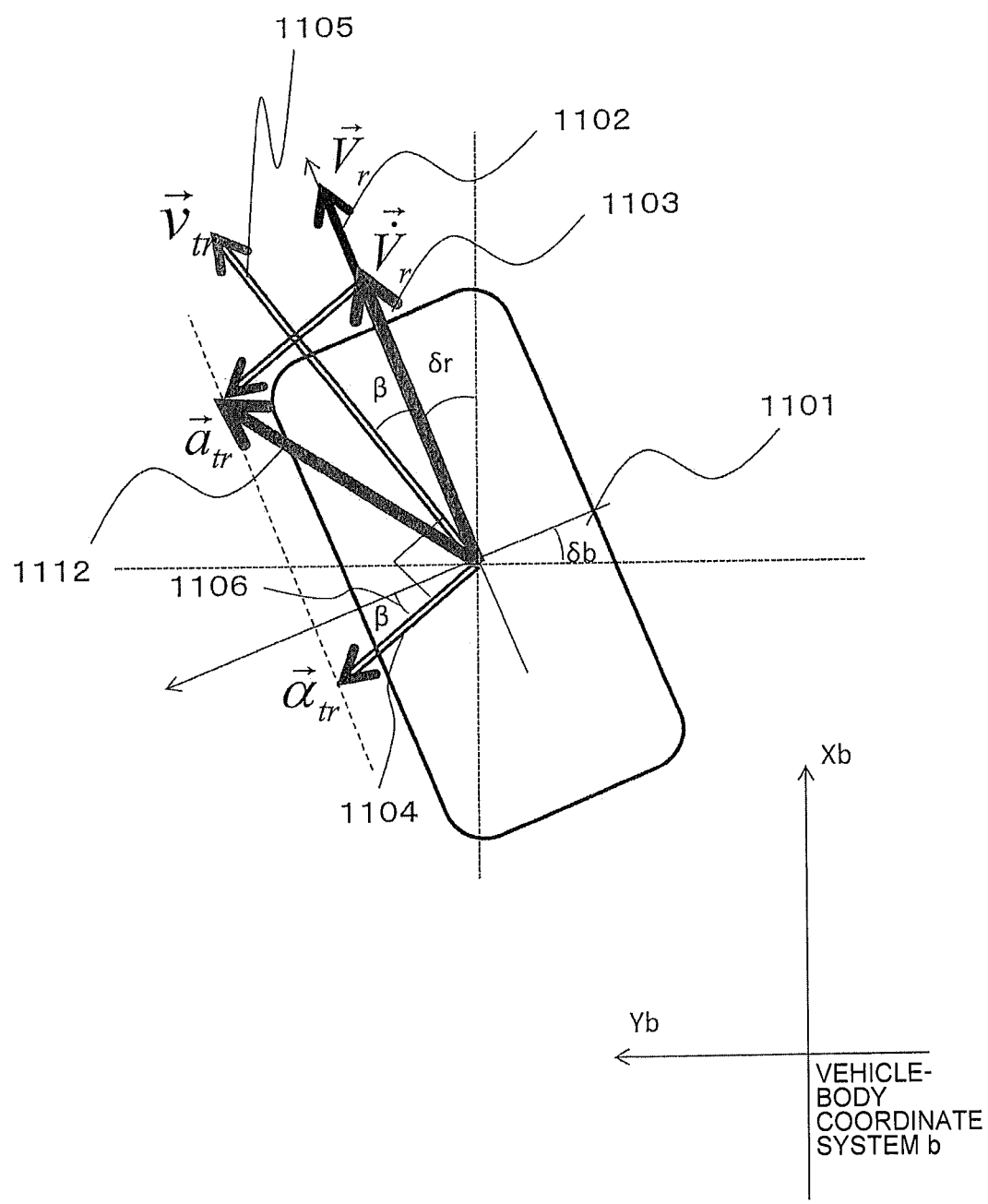
FIG. 11 is a diagram illustrating the relationship among a speed, acceleration, a steering angle and a slip angle on a wheel.

The processing in the wheel slip angle estimation section 123 will now be described with reference to FIG. 10 and FIG. 11. FIG. 10 is a diagram illustrating a processing flow of the wheel slip angle estimation section. FIG. 11 is a diagram illustrating the relationship of a speed, acceleration, a steering angle and a slip angle on the wheel. After the determination of the acceleration and the angular velocity on the road surface, a slip angle on each wheel 101 is calculated in the wheel slip angle estimation section 123 as described below.

Initially, at Step 1001, an inclination δb of the wheel from the Xb axis of the vehicle-body coordinate system b measured by the steering angle measurement device 106 is acquired.

Next, at Step 1002, the inclination δb of the wheel is converted to an inclination δr 1101 from the Xr axis of the road-surface coordinate system r. It is apparent here that δb=δr 1101 may be established, because the Xb-axis orientation and the Xr-axis orientation match each other from the definitions of the vehicle-body coordinate system b and the road-surface coordinate system r.

Next, at Step 1003, a wheel speed V at the wheel-road contact point is acquired from the wheel speed measurement device 107. As described above, a wheel speed at the wheel-road contact point is a travel speed (scalar value) on the road surface.

Next, at Step 1004, a velocity vector $V_r$ 1102 at the wheel-road contact point expressed in the road-surface coordinate system r is determined. If the amount of rotation of the wheel denotes a rotation in a tilt direction of the wheel, it may be suggested that the wheel speed V obtained in Step 1003 has magnitude of the velocity vector $V_r$ 1102 at the wheel-road contact point in the road-surface coordinate system r. Because of this, the velocity vector $V_r$ 1102 at the wheel-road contact point in the road-surface coordinate system r can be expressed as the following formula (11).

[Formula 11]

$$\vec{V}_r = V\begin{pmatrix}\cos\delta_r \\ \sin\delta_r \\ 0\end{pmatrix} = \begin{pmatrix}V\cos\delta_r \\ V\sin\delta_r \\ 0\end{pmatrix} \quad (11)$$

(A velocity vector at a wheel-road contact point in the road-surface coordinate system r)=(magnitude of a wheel speed in the road-surface coordinate system r)×(the road-surface coordinate system distribution component by a tilt of the wheel), where V is a speed obtained from the wheel speed measurement device 107, and $\delta_r$ is an inclination from the Xr axis of the road-surface coordinate system r obtained in Step 1002.

Next, at Step 1005, an acceleration vector (dV$_r$/dt) 1103 at the wheel-road contact point expressed in the road-surface coordinate system r is obtained. Because the velocity vector $V_r$ 1102 calculated in Step 1004 may be a time-differentiated value, the acceleration vector may be expressed as follows:

[Formula 12]

$$\frac{dV_r}{dt} = \begin{pmatrix}\dot{V}\cos\delta_r - V\sin\dot{\delta}_r \\ \dot{V}\sin\delta_r + V\cos\dot{\delta}_r \\ 0\end{pmatrix} \quad (12)$$

(A velocity vector at a wheel-road contact point in the road-surface coordinate system r)=(a time rate of change of a wheel speed in the road-surface coordinate system r)×(the road-surface coordinate system distribution component by a tilt of the wheel)+(a wheel speed in the road-surface coordinate system r)×(a time rate of change of the road-surface coordinate system distribution component by a tilt of the wheel)

Where $\dot{V}$ may be a first order derivative value of a speed V obtained from the wheel speed measurement device 107, which may assume a difference at the time of sampling in a simple manner. Also, $\dot{\delta}_r$ may be a first order derivative value of an inclination δr 1101 from the Xr axis of the road-surface coordinate system r obtained in Step 1002, which may assume a difference at the time of sampling in a simple manner.

Next, at Step 1006, a centripetal acceleration vector $\alpha_{tr}$ 1104 at a wheel-road contact point in the road-surface coordinate system r is calculated. From a difference between an acceleration vector $a_{tr}$ 1112 at a wheel-road contact point in the road-surface coordinate system r derived from the vehicle-body IMU 104 and an acceleration vector (dV$_r$/dt) 1103 at a wheel-road contact point expressed in the road-surface coordinate system r derived from the wheel speed measurement device 107, a centripetal acceleration vector $\alpha_{tr}$ 1104 at a wheel-road contact point in the road-surface coordinate system r is calculated as the following formula (13).

[Formula 13]

$$\vec{\alpha}_{tr} = \vec{a}_{tr} - \frac{dV_r}{dt} = \vec{a}_{tr} - \begin{pmatrix} \dot{V}\cos\delta_r - V\sin\dot{\delta}_r \\ \dot{V}\sin\delta_r + V\cos\dot{\delta}_r \\ 0 \end{pmatrix} \quad (13)$$

(A centripetal acceleration vector at a wheel-road contact point in the road-surface coordinate system r)=(an acceleration vector at a wheel-road contact point in the road-surface coordinate system r derived from the vehicle-body IMU 104)−(an acceleration vector at a wheel-road contact point expressed in the road-surface coordinate system r derived from the wheel speed measurement device 107)

Next, at Step 1007, a wheel slip angle is calculated. Because the tangential velocity component, a vector $V_{tr}$ 1105 is produced in a direction perpendicular to the centripetal acceleration vector $\alpha_{tr}$ 1104 at a wheel-road contact point in the road-surface coordinate system r which has been determined in Step 1006, a wheel sideslip angle β 1106 can be calculated as a sideslip angle β 1106 which is an angle formed between the centripetal acceleration vector $\alpha_{tr}$ 1104 at a wheel-road contact point in the road-surface coordinate system r and a vector crossing perpendicular to the travel direction of the wheel, by the following formula (14).

[Formula 14]

$$\beta = \arccos \frac{\vec{\alpha}_{tr} \cdot \begin{pmatrix} -\sin\delta_r \\ \cos\delta_r \\ 0 \end{pmatrix}}{|\vec{\alpha}_{tr}|} \quad (14)$$

(A sideslip angle)=arccos {(inner product of a centripetal acceleration vector at a wheel-road contact point in the road-surface coordinate system r and a unit vector in a wheel lateral direction)/(magnitude of a centripetal acceleration vector at a wheel-road contact point in the road-surface coordinate system r)

Through the above processing flow, the processing in the wheel slip angle estimation section 123 is terminated.

Figure 12:
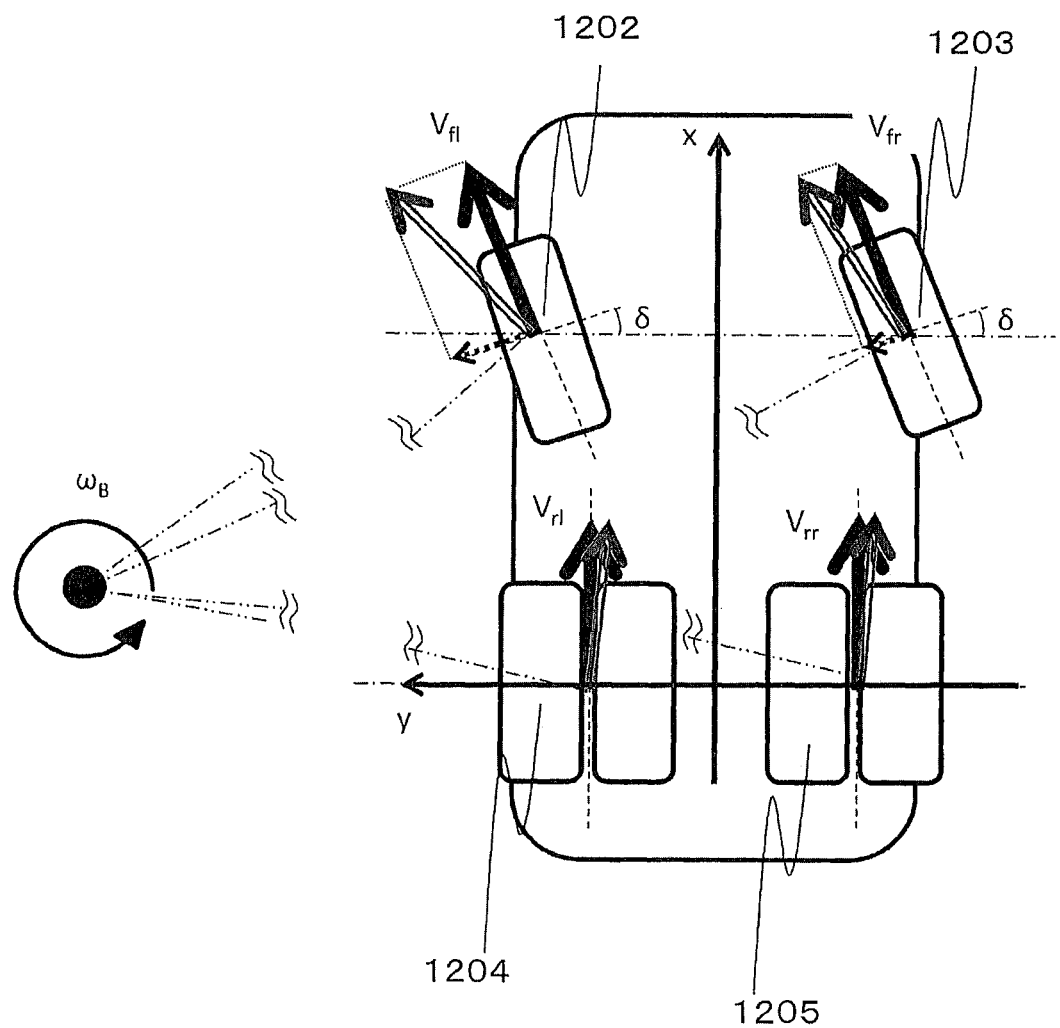
FIG. 12 is a diagram illustrating a 2D velocity vector when the vehicle is viewed from the top.

FIG. 12 is a diagram illustrating a 2D velocity vector when the vehicle is viewed from the top. The wheel slip angle estimation section 123 is capable of calculating a slip angle of a front left wheel 1202, a slip angle of a front right wheel 1203, a slip angle of a rear left wheel 1204 and a slip angle of a rear right wheel 1205 as in the foregoing method. It is noted that, if a plurality of wheels is continuously arranged such as the rear left wheels 1204 and the rear right wheels 1205, a slip angle between the wheel and the wheel may be obtained.

By the processing described up to this point, the wheel slip angle estimation section 123 is capable of estimating a slip angle with accuracy by use of an output value from the vehicle-body IMU 104 mounted to the vehicle body.

According to the first embodiment, in the dump truck 100 varying greatly in body weight, even if the vehicle body 103 and a road surface are not parallel, the wheel slip angle estimation section 123 is capable of using an output value from the vehicle-body IMU 104 mounted to the vehicle body 103 to estimate a slip angle in each wheel with accuracy.

Second Embodiment

The following is a description of a method for estimating a slip angle of a vehicle wheel in a configuration with a few number of measurement devices which differs from that of the first embodiment. Assuming also in the second embodiment that the road surface on which a dump truck 100a operates is an approximately flat plane at all instances. Further, the definition of each of the coordinate systems is the same as that in the first embodiment.

Figure 13:
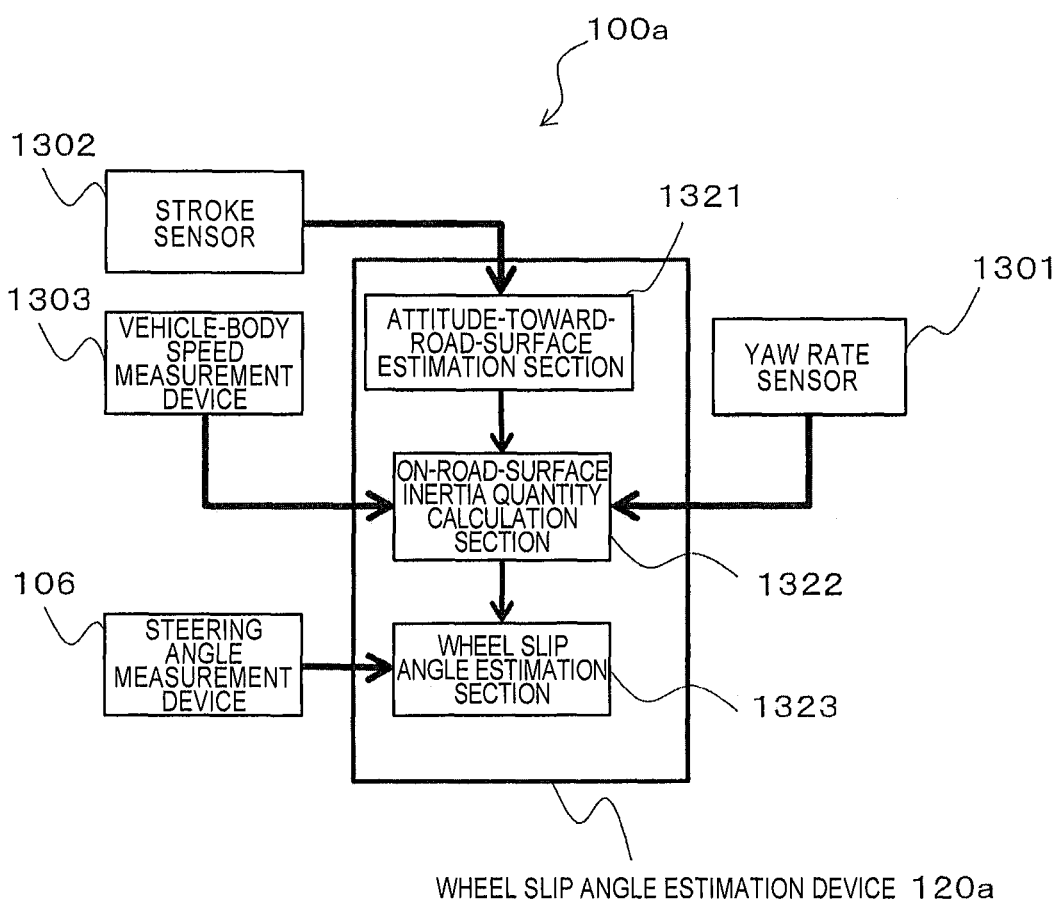
FIG. 13 is a block diagram illustrating a function configuration of a dump truck in a second embodiment.

FIG. 13 is a block diagram illustrating a function configuration of the dump truck 100a according to the second embodiment. As in the case of the first embodiment, the dump truck 100a is configured to include the vehicle wheels 101, the axles 102 connecting the left and right wheels to each other, and the vehicle body 103 to which the axles are joined through suspensions or the like.

Contemplated is a case where, as the vehicle-body IMU 104 mounted to the vehicle body 103 of the dump truck 100a, a yaw rate sensor 1301 is provided to measure angular velocity around the Zb axis of the vehicle-body coordinate system b, as shown in FIG. 13. Further, as the road-surface distance measurement device 105, a stroke sensor 1302 is used to measure a stroke mounted to the axle 102. The steering angle measurement device 106 is included to measure a tilt of the wheel, and, in place of the wheel speed measurement device 107, a vehicle-body speed measurement device 1303 is installed to measure a velocity of the vehicle body 103 relative to the road surface in the vehicle-body coordinate system b. The vehicle-body speed measurement device 1303 engages in conversion from a velocity in the global coordinate system e which is estimated using, for example, the Doppler frequency measured by a GNSS antenna mounted to the vehicle body 103, to the vehicle-body coordinate system b by the vehicle attitude measurement device or the like as used in the first embodiment. The vehicle-body speed measurement device 1303 also engages in measurement of a relative velocity between the vehicle body 103 and the road surface with a millimeter-wave radar mounted directly to the vehicle body 103, and the like. The steering angle measurement device 106 measures a steering angle of at least any one of the front left wheel 1202 and the front right wheel 1203 which are the steering wheels.

A method for estimating a wheel slip angle and a wheel slip angle estimation device 120a according to the second embodiment will be described. First, an attitude-toward-road-surface estimation section 1321 uses a measurement value of the stroke sensor 1302 to estimate an inclination between the road surface and the plane expanded by the Xb axis and the Yb axis of the vehicle-body coordinate system b, and calculates it as a coordinate conversion matrix $C_{rb}$ from the vehicle-body coordinate system b to the road-surface coordinate system r.

Next, an on-road-surface inertia quantity calculation section 1322 measures angular velocity around the Zb axis of the vehicle body 103 measured by the yaw rate sensor 1301, and speed of the vehicle body 103 measured by the vehicle-body speed measurement device 1303, and converts from them to speed and angular velocity at a wheel-road contact point expressed in the road-surface coordinate system r from the coordinate conversion matrix $C_{rb}$ from the vehicle-body coordinate system b to the road-surface coordinate system r estimated in the attitude-toward-road-surface estimation section 1321. Then, a wheel slip angle estimation section 1323, which estimates a slip angle of each wheel, uses the speed and angular velocity at the wheel-road contact point expressed in the road-surface coordinate system r obtained by the steering angle measurement device 106 and the on-road-surface inertia quantity calculation section 1322, to obtain a lateral velocity at the wheel-road contact point for high accurate estimation of a wheel slip angle.

One of methods of estimating a wheel slip angle in the above configuration is illustrated by example.

Figure 14:
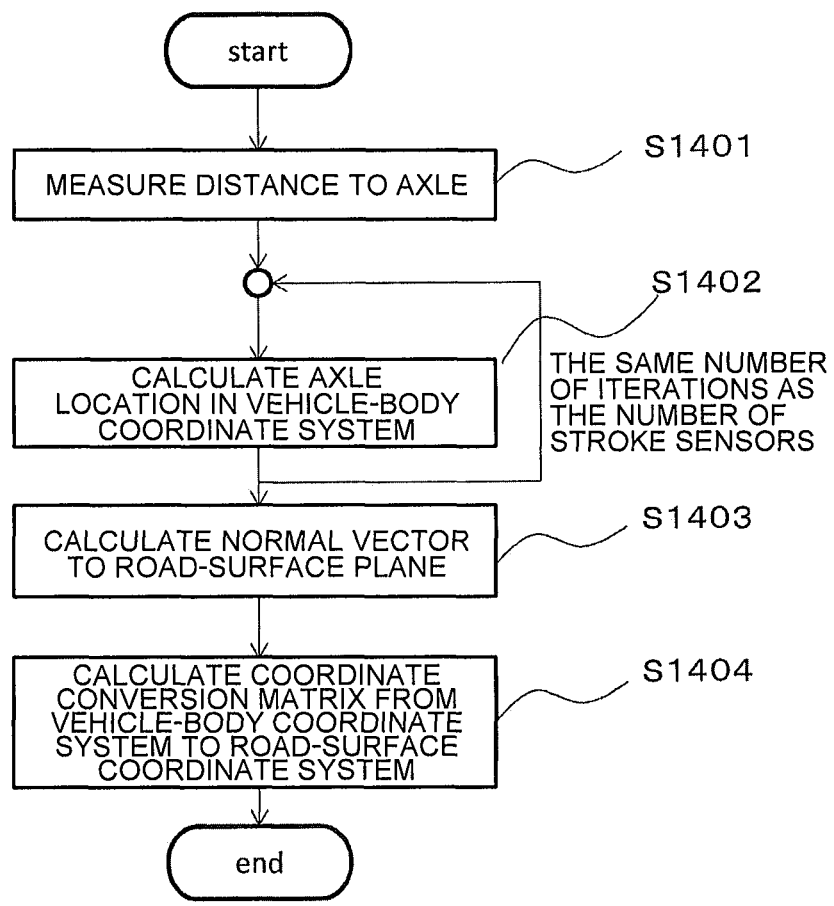
FIG. 14 is a diagram illustrating a processing flow of the attitude-toward-road-surface estimation section according to the second embodiment.

Initially, the processing in the attitude-toward-road-surface estimation section 1321 is described along the flow in FIG. 14. FIG. 14 is a diagram illustrating a processing flow of the attitude-toward-road-surface estimation section according to the second embodiment.

At Step 1401, the stroke sensor 1302 mounted for each wheel is caused to measure a distance from the starting point of the stroke sensor 1302 mounted to the vehicle body 103, to the axle 102. Assume that the stroke sensor 1302 measures a distance between the axle 102 and a location of the starting point at which the stroke sensor 1302 is attached to the vehicle body 103, while the stroke sensor 1302 is maintained perpendicularly to or at a certain angle with respect to the axle 102. Because a final value to be estimated is an inclination between the road-surface coordinate system r and the vehicle-body coordinate system b, it is deemed that a distortion of the wheel 101 may be neglected. Given that the axle under the spring is parallel to the road-surface plane, there is no requirement for direct measurement of a point on the road surface.

Next, at Step 1402, a location of the axle 102 expressed in the vehicle-body coordinate system b is acquired. If the coordinate conversion matrix $C_{bL}$ from the road-surface distance measurement device coordinate system L fixed to the n stroke sensors 1302 in total, to the vehicle-body coordinate system b is beforehand given by measuring an installation position or direction, when a location ($pix_b$, $piy_b$, $piz_b$) of the axle 102, which is measured by output $I_{iL}$ from the i-th stroke sensor i (0<i<n) expressed in the road-surface distance measurement device coordinate system L, is expressed in the vehicle-body coordinate system b, the installation position of the stroke sensor can be obtained by a point pi ($pix_b$, $piy_b$, $piz_b$) expressed in the vehicle-body coordinate system b as follows:

[Formula 15]

$$\begin{pmatrix} pix_b \\ piy_b \\ piz_b \end{pmatrix} = C_{bL} \begin{pmatrix} I_i \\ 0 \\ 0 \end{pmatrix} + \begin{pmatrix} Pix_b \\ Piy_b \\ Piz_b \end{pmatrix} (0 < i < n) \quad (15)$$

Next, at Step 1403, a normal vector to the road-surface plane is calculated. Where the n points in total are measured, a plane closest to these points can be obtained as a plane parallel to the road surface, and also a vector can be obtained by parallel translation of a normal vector $U_b$ to the road surface. Because the starting point of the normal vector to the plane is not important when an inclination is found in a later stage, a normal vector to a plane parallel to the road surface may be the normal vector $U_b$ to the road surface. The least-squares method is used to determine the normal vector $U_b$ to the road surface, which is expressed as the following formula (16).

[Formula 16]

$$\vec{U}_b = \begin{pmatrix} A \\ B \\ C \end{pmatrix} \quad (16)$$

Where the vector Ub is a normal unit vector to a plane Ax+By+Cz+D=0.

From the point coordinates (pixb, piyb, pizb) (3<i) of the axle 102 expressed in the vehicle-body coordinate system b measured by the stroke sensor 1302, which has obtained in Step 1402, the normal vector $U_b$ can be obtained by the least-squares method as follows:

[Formula 17]

$$\vec{U}_b = M^{-1} W \quad (17)$$

Where $$M = \begin{pmatrix} n & \sum_{i=1}^{n} pix_b & \sum_{i=1}^{n} piy_b \\ \sum_{i=1}^{n} pix_b & \sum_{i=1}^{n} pix_b pix_b & \sum_{i=1}^{n} pix_b piy_b \\ \sum_{i=1}^{n} piy_b & \sum_{i=1}^{n} pix_b piy_b & \sum_{i=1}^{n} piy_b piy_b \end{pmatrix}$$

$$W = \begin{pmatrix} \sum_{i=1}^{n} piz_b \\ \sum_{i=1}^{n} pix_b piz_b \\ \sum_{i=1}^{n} piy_b piz_b \end{pmatrix}$$

Next, at Step 1404, a coordinate conversion matrix from the vehicle-body coordinate system b to the road-surface coordinate system r is calculated. In accordance with the above mentioned definition, considering two orthogonal vectors which are obtained by projecting the Xb axis and Yb axis of the vehicle-body coordinate system b onto the road surface, the vectors of exr, eyr and a normal ezr to them match respectively an Xr axis, a Yr axis and a Zr axis, which thereby form the road-surface coordinate system r. From a rotation matrix $R_b$ of the Zb axis of the vehicle-body coordinate system b obtained in Step 1403 and of the normal vector $U_b$=(A, B, C) obtained from the plane equation parallel to the road surface expressed similarly in the vehicle-body coordinate system b, the coordinate conversion matrix $C_{rb}$ from the vehicle coordinate system b to the road-surface coordinate system r can be found similarly to Step 605 in the first embodiment.

Thus, the processing in the attitude-toward-road-surface estimation section 1321 is terminated.

Figure 15:
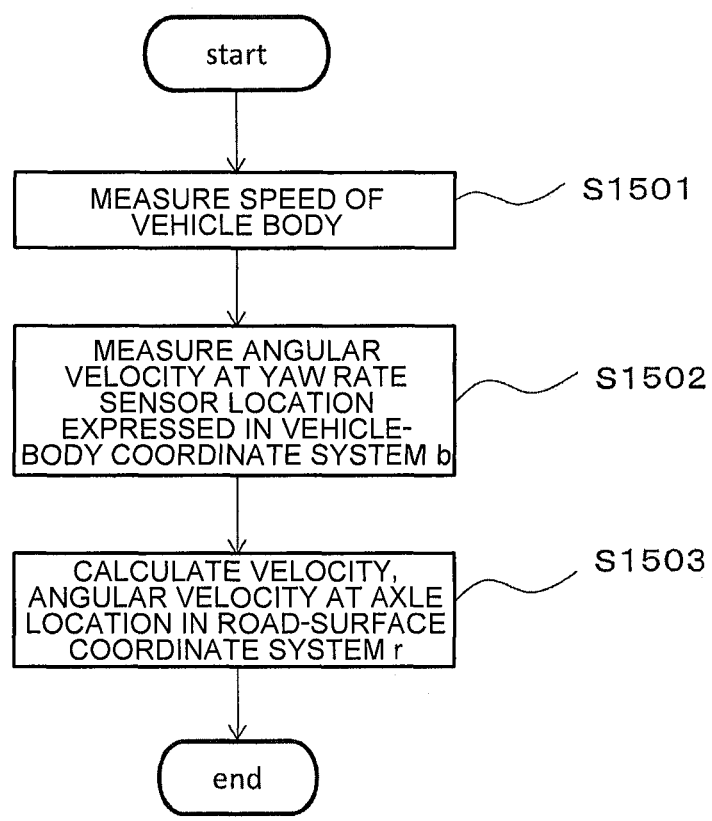
FIG. 15 is a diagram illustrating a processing flow of an on-road-surface inertia quantity calculation section according to the second embodiment.

Subsequently, the processing in the on-road-surface inertia quantity calculation section 1322 will be described along the flow in FIG. 15. FIG. 15 is a diagram illustrating a processing flow of the on-road-surface inertia quantity calculation section according to the second embodiment.

Initially, at Step 1501, the vehicle-body velocity vector $V_b$ is acquired from the vehicle-body speed measurement device 1303. The vehicle-body speed measurement device 1303 can measure a velocity of the vehicle body 103 in the direction of each axis of the vehicle-body coordinate system b relative to the road surface in a location where the vehicle-body speed measurement device 1303 is installed.

Next, at Step 1502, the yaw rate sensor 1301 is caused to measure angular velocity expressed in the vehicle-body coordinate system b around the Zb axis of the vehicle-body coordinate system b.

Next, at Step 1503, from the coordinate conversion matrix $C_{rb}$ obtained in the attitude-toward-road-surface estimation section 1321, the vehicle-body velocity vector $\vec{V}_b$ acquired in Step 1501, and an output value $\omega_{zb}$ from the gyro sensor which is the angular velocity of the Zb axis of the vehicle-body coordinate system b acquired in Step 1502 are expressed in the road-surface coordinate system r. By the coordinate conversion matrix $C_{rb}$ from the vehicle-body coordinate system b to the road-surface coordinate system r, a velocity vector $\vec{V}_r$ on the plane parallel to the road surface and an angular velocity vector $\omega_r$ are expressed as the following formula (18).

[Formula 18]

$$\left. \begin{array}{l} \vec{\omega}_r = C_{rb}\begin{pmatrix} 0 \\ 0 \\ \omega_{zb} \end{pmatrix} \\ \vec{V}_r = C_{rb}\vec{V}_b \end{array} \right\} \quad (18)$$

Therefore, the velocity vector $V_{tr}$ in each axle location expressed in the road-surface coordinate system r on the plane parallel to the road surface is expressed as the following formula (19).

[Formula 19]

$$\vec{V}_{tr} = \vec{V}_r + \vec{\omega}_r \times C_{rb}\vec{r}_b \quad (19)$$

(A velocity in each axle location expressed in the road-surface coordinate system r on a plane parallel to the road surface)=(a velocity expressed in the road-surface coordinate system r in a location of the vehicle-body speed measurement device)+(the transport component derived from angular velocity expressed in the road-surface coordinate system r)

Where $\vec{r}_b$ expresses a vector from the vehicle-body speed measurement device 1303 to each axle 102 in the vehicle-body coordinate system b.

Through the above processing flow, the processing in the on-road-surface inertia quantity calculation section 1322 is terminated.

Figure 16:
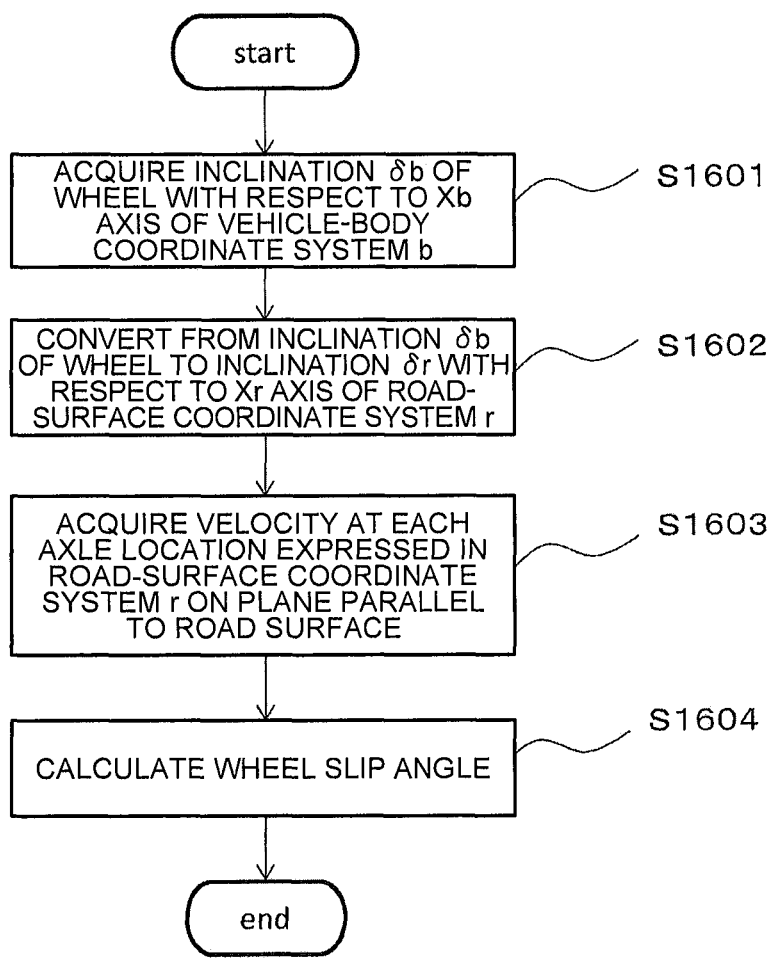
FIG. 16 is a diagram illustrating a processing flow of wheel slip angle estimation means according to the second embodiment.
Figure 17:
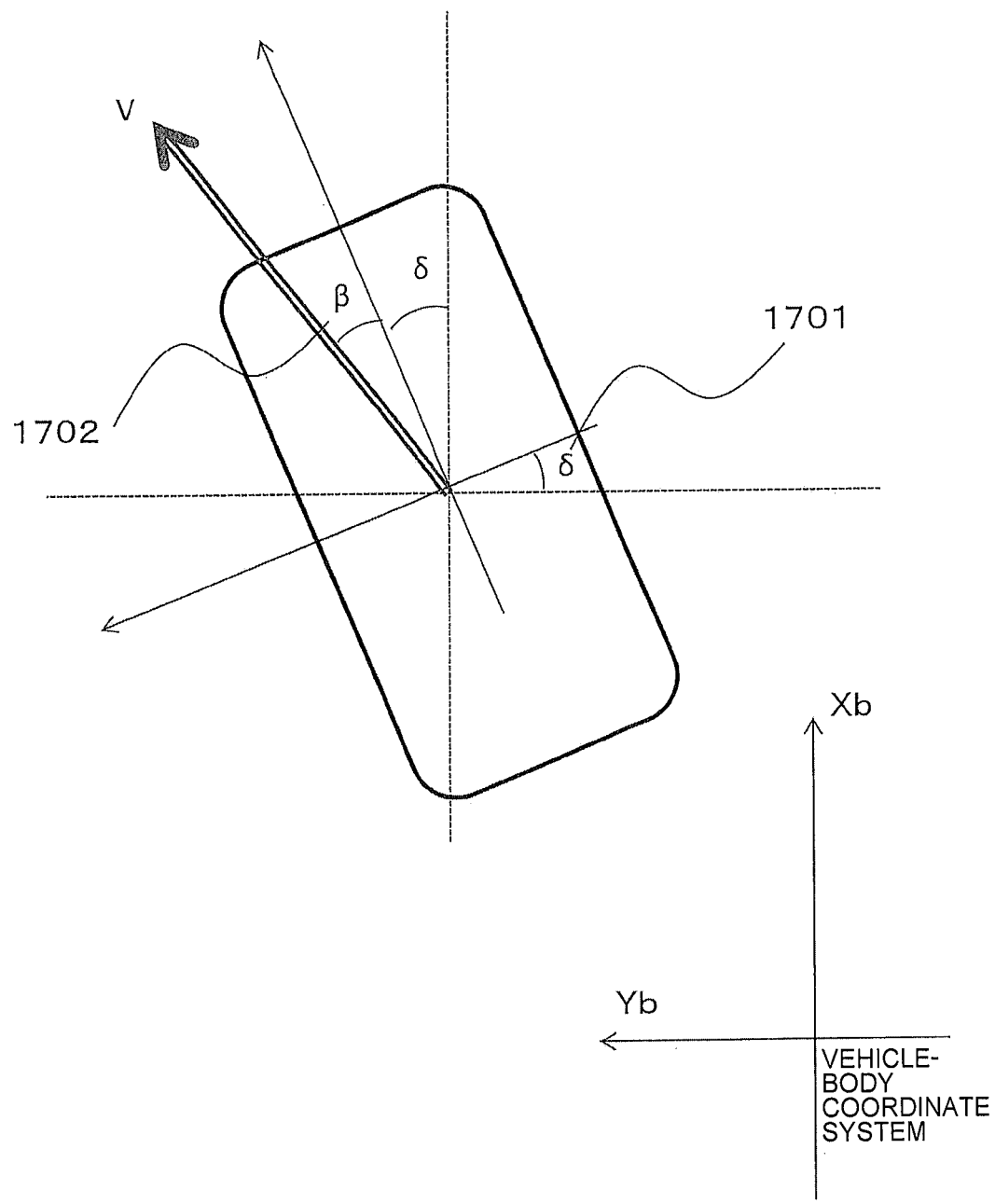
FIG. 17 is a model diagram illustrating the relationship between a speed and a slip angle in a wheel according to the second embodiment.

The processing of the wheel slip angle estimation section performed in the wheel slip angle estimation section 1323 according to the second embodiment will now be described with reference to FIG. 16 and FIG. 17. FIG. 16 is a diagram illustrating the processing flow of wheel slip angle estimation means according to the second embodiment. FIG. 17 is a model diagram illustrating the relationship between a speed and a slip angle in a wheel according to the second embodiment.

Initially, at Step 1601, an inclination δb of the wheel with respect to the Xb axis of the vehicle-body coordinate system b, which has been measured by the steering angle measurement device 106 is acquired.

Next, at Step 1602, the inclination δb of the wheel is converted to an inclination δr 1701 with respect to the Xr axis of the road-surface coordinate system r. It is apparent here that δb=δr 1701 may be set because the Xb-axis orientation and the Xr-axis orientation match each other from the definitions of the vehicle-body coordinate system b and the road-surface coordinate system r.

Next, at Step 1603, acquired is a velocity vector $V_{tr}$ in each axle location expressed in the road-surface coordinate system r on the plane parallel to the road surface in each axle 102 calculated in the on-road-surface inertia quantity calculation section 1322.

Next, at Step 1604, a wheel slip angle is calculated from two, the inclination δ 1701 of the wheel 101 with respect to the road-surface coordinate system r obtained in Step 1602, and the velocity vector $V_{tr}$ in each axle location on the plane parallel to the road surface obtained in Step 1603. A wheel sideslip angle β 1702 can be obtained by the following formula (20).

[Formula 20]

$$\beta = \arccos\frac{V_{try}}{|\vec{V}_{tr}|} - \delta_r \quad (20)$$

(A wheel slip angle)=arccos ((the lateral component of velocity in each axle location on the plane parallel to the road surface expressed in the road-surface coordinate system r)/(the magnitude of velocity in each axle location on the plane parallel to the road surface))−(a steering angle expressed in the road-surface coordinate system r)

According to the second embodiment, as in the case of the first embodiment, in a dump truck varying greatly in body weight, even if the vehicle body 103 and a road surface are not parallel, the wheel slip angle estimation section 123 is capable of using an output value from the vehicle-body IMU 104 mounted to the vehicle body 103 to estimate a slip angle in each wheel with accuracy. In addition to this, estimation of a wheel slip angle is enabled in the configuration with a fewer number of measurement devices than that in the first embodiment.

The present invention is not limited to the above embodiments, and various modified forms may be made without departing from the scope and sprit of the present invention. For example, as the arrangement of the present invention, if a part of the first embodiment and a part of the second embodiment are exchanged or combined, the same advantageous effects can be produced.

REFERENCE SIGNS LIST 100, 100a . . . Dump truck
101 . . . Vehicle wheel
102 . . . Axle
103 . . . Vehicle body
104 . . . Vehicle-body IMU
105 . . . Road-surface distance measurement device
106 . . . Steering angle measurement device
107 . . . Wheel speed measurement device
120, 120a . . . Wheel slip angle calculation device
121 . . . Attitude-toward-road-surface estimation section
122 . . . On-road-surface inertia quantity calculation section
123 . . . Wheel slip angle estimation section

The invention claimed is:

1. A device for estimating a slip angle of a vehicle wheel of a dump truck, the dump truck being equipped with vehicle wheels and a vehicle body on the vehicle wheels via suspensions, and comprising a three-axis acceleration sensor that is mounted to the vehicle body to output an acceleration of the vehicle body, a gyro sensor that is mounted to the vehicle body to output an angular velocity of the vehicle body, one or more Laser Imaging Detection and Ranging (LIDAR) sensors configured to measure a distance to a road surface including a wheel-road contact point of the vehicle wheel mounted to the vehicle body, and a processor programmed to:

use a series of distances to measurement points on the road surface measured by the one or more LIDAR sensors to estimate vehicle body coordinate system-road surface coordinate system conversion information for conversion from a vehicle body coordinate system of a three orthogonal axis system including a longitudinal axis of the vehicle body, a lateral axis of the vehicle body and an up-down axis orthogonal to both the longitudinal axis and the lateral axis, to a road surface coordinate system of a three orthogonal axis system including two orthogonal axes obtained by projecting the longitudinal axis and the lateral axis onto the road surface and a road surface vertical axis perpendicular to the two orthogonal axes;

remove a gravity acceleration component from acceleration of the vehicle body measured by the three-axis acceleration sensor defined by the vehicle body coordinate system in order to obtain an acceleration caused by vehicle body motion, and use the vehicle body coordinate system-road surface coordinate system conversion information to convert from the acceleration caused by vehicle body motion and angular velocity output by the gyro sensor to the road surface coordinate system;

acquire a steering angle of the vehicle wheel and acquire a wheel speed of the vehicle wheel;

determine a wheel acceleration vector derived from the wheel speed of the vehicle wheel along an inclination direction of the vehicle wheel, on the basis of the steering angle and the wheel speed;

use the acceleration and angular velocity caused by vehicle body motion converted to the road surface coordinate system to calculate an acceleration vector at the wheel-road contact point derived from the three-axis acceleration sensor and the gyro sensor; and estimate a sideslip angle of the vehicle wheel on the basis of a difference between the acceleration vector and the wheel acceleration vector at a wheel-road contact point.

2. The device for estimating a slip angle of a vehicle wheel of the dump truck according to claim 1, wherein the processor is further programmed to:

obtain a normal vector to the road surface defined by the vehicle body coordinate system, on the basis of the series of distances to measurement points on the road surface, calculate an inclination angle of the road surface vertical axis and the normal vector, and use the inclination angle to estimate the vehicle body coordinate system-road surface coordinate system conversion information.

3. The device for estimating a slip angle of a vehicle wheel of the dump truck according to claim 1, wherein the processor is further programmed to:

measure a roll angle, a pitch angle and a yaw angle which are conversion parameters from a global coordinate system of which relation to the road surface coordinate system is perpetually constant, to the vehicle body coordinate system, estimate global coordinate system-vehicle body coordinate system conversion information to convert from the global coordinate system, to the vehicle body coordinate system on the basis of these measured values, use the global coordinate system-vehicle body coordinate system conversion information to convert from gravity acceleration to the vehicle body coordinate system, and remove gravity acceleration, after the conversion, from the acceleration of the vehicle body measured by the three-axis acceleration sensor.

4. The device for estimating a slip angle of a vehicle wheel of the dump truck according to claim 1, wherein the processor is programmed to:

determine a centripetal acceleration vector in the road surface coordinate system from a difference of the wheel acceleration vector and the acceleration vector, and estimate, as a sideslip angle of the vehicle wheel, an angle formed between the centripetal acceleration vector and a vector crossing perpendicular to the wheel acceleration vector on the road surface.

5. The device for estimating a slip angle of a vehicle wheel of the dump truck according to claim 1, wherein the dump truck further comprises a front left wheel, a front right wheel, a rear left wheel and a rear right wheel, and wherein the processor is programmed to:

determine, for each of the front left vehicle wheel, the front right vehicle wheel, the rear left vehicle wheel and the rear right vehicle wheel, the wheel acceleration vector at each wheel-road contact point of each vehicle wheel in contact with the road surface, and the acceleration vector derived from the three-axis acceleration sensor at the each wheel-road contact point.

6. The device for estimating a slip angle of a vehicle wheel of the dump truck according to claim 1, wherein the one or more LIDAR sensors measure two or more points on the road surface which are able to be connected or approximated by a single straight line intersecting a travel direction of the vehicle body at the same time of sampling.

7. A device for estimating a slip angle of a vehicle wheel of a dump truck, the dump truck being equipped with vehicle wheels and a vehicle body on the vehicle wheels via suspensions, and comprising: a stroke sensor that measures a stroke distance between the vehicle wheel and the vehicle body, a vehicle body speed measurement device configured to include a GNSS antenna or a millimeter-wave radar that measures a speed of the vehicle body, a yaw rate sensor that measures a yaw rate of the vehicle body, and a processor programmed to:

use the stroke distance to estimate vehicle body coordinate system-road surface coordinate system conversion information for conversion from a vehicle body coordinate system of a three orthogonal axis system including a longitudinal axis of the vehicle body, a lateral axis of the vehicle body and an up-down axis orthogonal to both the longitudinal axis and the lateral axis, to a road surface coordinate system of a three orthogonal axis system including two orthogonal axes and a road surface vertical axis perpendicular to the two orthogonal axes, the two orthogonal axes being obtained by projecting the longitudinal axis and the lateral axis onto a plane parallel to the road surface contacted by the vehicle wheel in an axle location of an axle connecting the vehicle wheels;

convert from angular velocity of the vehicle body output by the yaw rate sensor and a vehicle body velocity vector measured by the vehicle body speed measurement device to the road surface coordinate system on the basis of the vehicle body coordinate system-road surface coordinate system conversion information;

estimate a vehicle body velocity vector expressed in the road surface coordinate system in the axle location on the plane on the basis of the angular velocity of the vehicle body and the vehicle body velocity vector which have been converted to the road surface coordinate system; and estimate a sideslip angle of the vehicle wheel, based on an acquired steering angle, and a value obtained by dividing a lateral component of a vehicle body velocity vector in the axle location by magnitude of the vehicle body velocity vector.

8. A method for estimating a slip angle of a vehicle wheel in a dump truck equipped with vehicle wheels and a vehicle body on the vehicle wheels via suspensions, comprising the steps of:

by use of a series of distances to measurement points on a road surface measured by a road surface distance measurement device that measures a distance to the road surface contacted by the vehicle body and the vehicle wheel mounted to the vehicle body, estimating vehicle body coordinate system-road surface coordinate system conversion information for conversion from a vehicle body coordinate system of a three orthogonal axis system including a longitudinal axis of the vehicle body, a lateral axis of the vehicle body and an up-down axis orthogonal to both the longitudinal axis and the lateral axis, to a road surface coordinate system of a three orthogonal axis system including two orthogonal axes obtained by projecting the longitudinal axis and the lateral axis onto the road surface and a road surface vertical axis perpendicular to the two orthogonal axes;

acquiring acceleration and angular velocity measured by a vehicle body inertial measurement unit mounted to the vehicle body, and removing a gravity acceleration component from the acceleration to obtain acceleration and angular velocity caused by motion of the vehicle body, and converting from the acceleration and angular velocity caused by the motion of the vehicle body to the road surface coordinate system by use of the vehicle body coordinate system-road surface coordinate system conversion information; and acquiring a steering angle from a steering angle measurement device that measures a steering angle of the vehicle wheel, and acquiring a wheel speed from a wheel speed measurement device that measures a wheel speed based on RPM of the vehicle wheel, and determining a wheel acceleration vector derived from the wheel speed measurement device along an inclination direction of the vehicle wheel, and using the acceleration and angular velocity caused by motion of the vehicle body converted to the road surface coordinate system to determine an acceleration vector at a wheel-road contact point derived from the vehicle body inertial measurement unit, and estimating a sideslip angle of the vehicle wheel on the basis of a difference between the acceleration vector and the wheel acceleration vector at a wheel-road contact point derived from the wheel speed measurement device.

9. A method for estimating a slip angle of a vehicle wheel in a dump truck comprising vehicle wheels and a vehicle body on the vehicle wheels via suspensions, comprising the steps of:

by use of a stroke distance acquired from a stroke sensor that measures the stroke distance between the vehicle wheel and the vehicle body, estimating vehicle body coordinate system-road surface coordinate system conversion information for conversion from a vehicle body coordinate system of a three orthogonal axis system including a longitudinal axis of the vehicle body, a lateral axis of the vehicle body and an up-down axis orthogonal to both the longitudinal axis and the lateral axis, to a road surface coordinate system of a three orthogonal axis system including two orthogonal axes and a road surface vertical axis perpendicular to the two orthogonal axes, the two orthogonal axes being obtained by projecting the longitudinal axis and the lateral axis onto a plane parallel to the road surface contacted by the vehicle wheel in an axle location of an axle connecting the vehicle wheels;

acquiring angular velocity of the vehicle body from a yaw rate sensor that measures a yaw rate of the vehicle body, and acquiring a vehicle body velocity vector from a vehicle body speed measurement device that measures speed of the vehicle body, and converts from the angular velocity and vehicle body velocity vector acquired to the road surface coordinate system on the basis of the vehicle body coordinate system-road surface coordinate system conversion information, and estimating a vehicle body velocity vector expressed in the road surface coordinate system in the axle location on the plane on the basis of the angular velocity and the vehicle body vehicle body velocity vector which have been converted to the road surface coordinate system; and estimating a sideslip angle of the vehicle wheel on the basis of a steering angle acquired from a steering angle measurement device that measures steering angle of the vehicle wheel, and a value obtained by dividing a lateral component of a vehicle body velocity vector in the axle location by magnitude of the vehicle body velocity vector.

* * * * *